(12) United States Patent
Segal et al.

(10) Patent No.: US 12,056,712 B2
(45) Date of Patent: *Aug. 6, 2024

(54) NETWORK SECURITY SYSTEMS AND METHODS FOR DETECTING FRAUD

(71) Applicant: MASTERCARD INTERNATIONAL INCORPORATED, Purchase, NY (US)

(72) Inventors: Mario Segal, Stamford, CT (US); Ziying Li, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,357

(22) Filed: Jun. 15, 2023

(65) Prior Publication Data
US 2023/0325843 A1 Oct. 12, 2023

Related U.S. Application Data

(63) Continuation of application No. 16/389,631, filed on Apr. 19, 2019, now Pat. No. 11,748,757.

(51) Int. Cl.
*G06Q 20/40* (2012.01)
*G06N 20/00* (2019.01)
*H04W 12/12* (2021.01)

(52) U.S. Cl.
CPC ......... *G06Q 20/4016* (2013.01); *G06N 20/00* (2019.01); *G06Q 20/409* (2013.01); *H04W 12/12* (2013.01)

(58) Field of Classification Search
CPC .......................... G06Q 20/4016; G06Q 20/40
See application file for complete search history.

(56) References Cited

U.S. PATENT DOCUMENTS

| | | | |
|---|---|---|---|
| 5,892,900 | A | 4/1999 | Ginter et al. |
| 6,094,643 | A | 7/2000 | Anderson et al. |
| 6,330,546 | B1 | 12/2001 | Gopinathan et al. |
| 6,430,305 | B1 | 8/2002 | Decker |
| 7,668,769 | B2 | 2/2010 | Baker et al. |
| 7,761,379 | B2 | 7/2010 | Zoldi et al. |
| 8,140,301 | B2 | 3/2012 | Abe et al. |
| 8,571,982 | B2 | 10/2013 | Choudhuri et al. |

(Continued)

*Primary Examiner* — Edward Chang
(74) *Attorney, Agent, or Firm* — Armstrong Teasdale LLP

(57) ABSTRACT

A system for detecting fraud within a payment card network includes a memory storing historical transaction data and a processor configured to identify a set of historical transaction data, the set of historical transaction data include one or more test transactions labeled as having been used to test validity of an underlying account, train a model using the identified set of historical transaction data as labeled training data, the model is configured to accept transaction data associated with an input transaction and to classify the input transaction as a test transaction, apply a suspect transaction of a cardholder account as the input transaction to the model, the model generates an indication that the suspect transaction is a test transaction, mark the cardholder account as compromised based on having experienced test transaction activity, and reject a pending transaction based on the cardholder account being marked as compromised.

20 Claims, 13 Drawing Sheets

(56) References Cited

U.S. PATENT DOCUMENTS

| | | |
|---|---|---|
| 8,600,872 B1 | 12/2013 | Yan |
| 8,606,712 B2 | 12/2013 | Choudhuri et al. |
| 8,666,861 B2 | 3/2014 | Li et al. |
| 9,483,765 B2 | 11/2016 | Sahadevan et al. |
| 9,842,338 B1 | 12/2017 | Shukla et al. |
| 9,953,321 B2 | 4/2018 | Zoldi et al. |
| 9,996,837 B2 | 6/2018 | Siddens et al. |
| 10,089,683 B2 | 10/2018 | Dominguez |
| 10,102,530 B2 | 10/2018 | Zoldi et al. |
| 2001/0027424 A1 | 10/2001 | Torigoe |
| 2005/0133588 A1 | 6/2005 | Williams |
| 2005/0149455 A1 | 7/2005 | Bruesewitz et al. |
| 2008/0172316 A1 | 7/2008 | Adams |
| 2008/0288405 A1 | 11/2008 | John |
| 2011/0047044 A1* | 2/2011 | Wright .................. G06Q 40/08 705/26.35 |
| 2011/0238510 A1 | 9/2011 | Rowen et al. |
| 2011/0307382 A1 | 12/2011 | Siegel et al. |
| 2012/0226613 A1 | 9/2012 | Adjaoute |
| 2013/0024375 A1 | 1/2013 | Choudhuri et al. |
| 2013/0024376 A1 | 1/2013 | Choudhuri et al. |
| 2014/0122325 A1 | 5/2014 | Zoldi et al. |
| 2014/0324699 A1 | 10/2014 | Ding et al. |
| 2015/0161611 A1 | 6/2015 | Duke et al. |
| 2015/0178735 A1* | 6/2015 | Liu ........................ G06Q 20/40 705/44 |
| 2017/0024828 A1 | 1/2017 | Michel et al. |

\* cited by examiner

NETWORK SECURITY SYSTEMS AND METHODS FOR DETECTING FRAUD

CROSS REFERENCE TO RELATED APPLICATIONS

This application is a continuation of U.S. patent application Ser. No. 16/389,631, filed Apr. 19, 2019, which is hereby incorporated by reference in its entirety.

FIELD OF THE DISCLOSURE

The field of the disclosure relates generally to network security and, more specifically, to systems and methods for identifying compromised accounts before the account is subject to significant fraud.

BACKGROUND

As the Internet has proliferated, fraudsters have increasingly attempted to exploit the Internet for nefarious purposes. Fraudsters seek to steal sensitive account information associated with payment cards, often stealing such payment card information for thousands of accounts at a time. This payment card information may include a primary account number (PAN) for the payment card, an expiration date, and a security code (e.g., Card Verification Value or CVV). In a form of identity theft, a fraudster may use this payment card information to pretend to be the person who owns the account (e.g., a legitimate cardholder) and to make fraudulent transactions with the account.

Fraudsters steal payment card information in many ways. For example, a fraudster may simply get the payment card information from the physical payment card itself (e.g., by stealing the payment card or copying the payment card information when the payment card's owner is not looking). A fraudster may also obtain payment card information by hacking computer systems (e.g., of merchants, issuing banks, payment networks, and so forth). Both online stores and brick-and-mortar stores alike typically store payment card information associated with past transactions on their computer systems. User profiles associated with users of online stores may also have saved payment card information so that the stores' users can avoid retyping the same payment card information during future transactions, making the users' experience more convenient. Some fraudsters may find vulnerabilities in security firewalls or other computer systems and may exploit those vulnerabilities to steal payment card information. Other fraudsters may use phishing schemes, where the fraudsters trick users into revealing their login information, such as usernames and passwords. The fraudster may then use this login information to access the user's account, and if the user's profile includes saved payment card information, the fraudster can then use the user's account to conduct fraudulent transactions.

Known systems of addressing this type of fraud typically require the cardholder to notice a fraudulent transaction on their payment card statement, and then report the fraudulent transaction. The appropriate entities (e.g., merchants, issuing banks, payment networks) may then reverse the fraudulent transaction and then cancel the payment card account to avoid future fraudulent transactions. Unfortunately, in these known systems, the cardholder may not notice the fraud on their billing statement right away. Moreover, when the fraud is detected, the cancellation of the cardholder's account can be inconvenient and frustrating for the cardholder, the merchant, and the issuer. Investigations into individual fraud events can be time-consuming and costly, as well.

Further, because the fraud was perpetrated through identify theft, the actual identity of the fraudster often remains unknown. The difficulty of catching the fraudster contributes to the prevalence of payment card fraud. In fact, black markets exist for stolen payment card information. On these black markets, an anonymous seller (e.g., the fraudster) with stolen payment card information (e.g., individual payment cards or entire batches of stolen payment cards) can sell the payment card information to anonymous buyers who wish to use the stolen payment cards to make fraudulent transactions. These black market sales are often made on the "dark web", which is an anonymous, encrypted network hidden within the Internet that is accessed with software that hides the identity of the anonymous black market sellers and black market buyers. This secrecy and anonymity contributes to the difficulty of catching not only the fraudsters, but the fraud itself.

Accordingly, a system is needed that is configured to identify compromised accounts before the cardholder account is subject to significant fraud or theft.

BRIEF DESCRIPTION

In an embodiment, a system for detecting fraud within a payment card network is provided. The system includes a memory storing historical transaction data and at least one processor configured to execute instructions. The instructions cause the processor to identify a set of historical transaction data. The set of historical transaction data includes one or more test transactions labeled as having been used to test validity of an underlying account. The instructions also cause the processor to train a model using the identified set of historical transaction data as labeled training data. The model is configured to accept transaction data associated with an input transaction as input. The model is also configured to classify the input transaction as one of a test transaction and not a test transaction. The instructions further cause the processor to apply a suspect transaction of a cardholder account as the input transaction to the model. The model generates an indication that the suspect transaction is a test transaction. The instructions also cause the processor to mark the cardholder account as compromised based on having experienced test transaction activity. The instructions further cause the processor to reject a pending transaction based on the cardholder account being marked as compromised.

In another embodiment, a computer-implemented method for detecting fraud within a payment card network is provided. The method is implemented using a processor in communication with a memory. The method includes identifying a set of historical transaction data. The set of historical transaction data includes one or more test transactions labeled as having been used to test validity of an underlying account. The method also includes training a model using the identified set of historical transaction data as labeled training data. The model is configured to accept transaction data associated with an input transaction as input. The model is also configured to classify the input transaction as one of a test transaction and not a test transaction. The method further includes applying a suspect transaction of a cardholder account as the input transaction to the model. The model generates an indication that the suspect transaction is a test transaction. The method also includes marking the cardholder account as compromised based on having experienced test transaction activity. The method further includes rejecting a pending transaction based on the cardholder account being marked as compromised.

In yet another embodiment, a non-transitory computer readable medium that includes computer executable instructions is provided. When executed by a computing device comprising at least one processor in communication with at least one memory device, the computer executable instructions cause the computing device to identify a set of historical transaction data. The set of historical transaction data includes one or more test transactions labeled as having been used to test validity of an underlying account. The computer executable instructions also cause the processor to train a model using the identified set of historical transaction data as labeled training data. The model is configured to accept transaction data associated with an input transaction as input. The model is also configured to classify the input transaction as one of a test transaction and not a test transaction. The computer executable instructions further cause the processor to apply a suspect transaction of a cardholder account as the input transaction to the model. The model generates an indication that the suspect transaction is a test transaction. The computer executable instructions also cause the processor to mark the cardholder account as compromised based on having experienced test transaction activity. The computer executable instructions further cause the processor to reject a pending transaction based on the cardholder account being marked as compromised.

BRIEF DESCRIPTION OF THE DRAWINGS

FIG. 1 is a schematic diagram illustrating an example multi-party payment processing system for enabling payment-by-card transactions.

FIG. 2 is a block diagram of an example fraud detection device used for detecting fraud in accordance with an example embodiment of the present disclosure.

FIG. 3 illustrates an example configuration of a client system shown in FIG. 2, in accordance with one embodiment of the present disclosure.

FIG. 4 illustrates an example configuration of the server system shown in FIG. 2, in accordance with an embodiment of the present disclosure.

FIG. 5 illustrates an example configuration of the fraud detection device shown in FIG. 2, in accordance with an embodiment of the present disclosure.

FIG. 6 is a component diagram of the fraud detection device and associated data flow, in accordance with an example embodiment of the present disclosure.

FIG. 7 is a block diagram illustrating an example data flow of the fraud detection device shown in FIG. 2, in accordance with an example embodiment of the present disclosure.

FIG. 8 shows an example configuration of a pattern detector device included within the fraud detection device shown in FIG. 2, in accordance with one embodiment of the present disclosure.

FIG. 9 is a flowchart illustrating an example process for identifying fraudulently compromised merchants and cardholder accounts, which may be implemented utilizing the system shown in FIG. 2.

FIG. 10 is a flowchart illustrating an exemplary process for handling compromises detected by the fraud detection device shown in FIG. 2.

FIG. 11 is a flowchart illustrating an example process for using machine learning to incrementally adjust a set of fraud risk rules, which may be implemented utilizing the system shown in FIG. 2.

FIG. 12 is a flowchart illustrating an example method for detecting fraud within a payment card network.

FIG. 13 is a component diagram of an example computer system including multiple components for performing the processes described in FIGS. 9-12.

DETAILED DESCRIPTION

Figure 1:
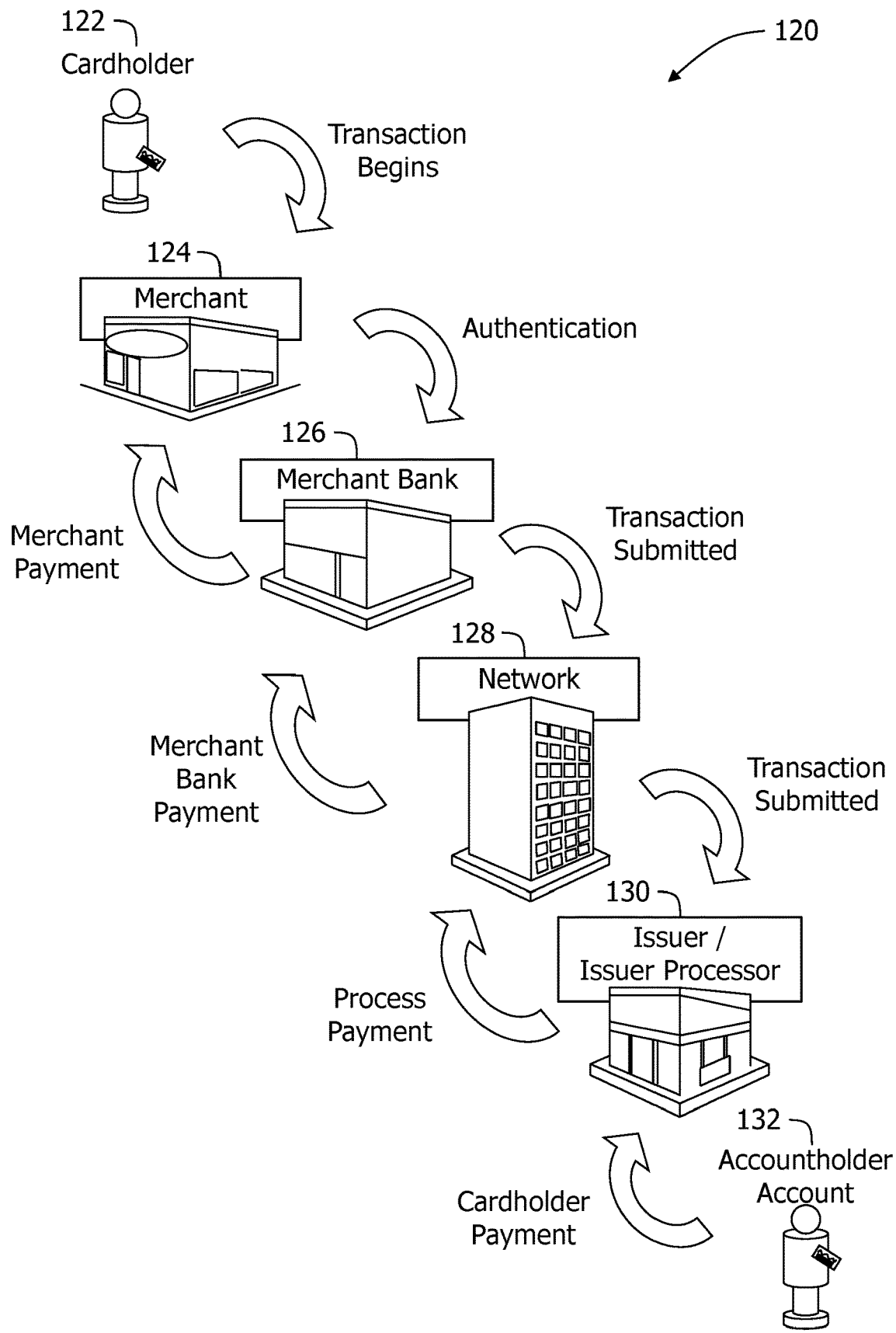
FIGS. 1-13 show example embodiments of the systems and methods described herein.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, methods and systems utilizing historical transaction data to develop and customize transaction criteria for identifying compromised merchants and cardholder accounts, and for identifying merchants and cardholder accounts that have a high risk for fraud before significant fraud actually occurs. In some example embodiments, the disclosed systems and methods may also prevent future fraudulent transactions.

As used herein, the term "fraud" is used in the context of payment card transactions and refers, generally, to any unprivileged activity using payment card information, such as a theft, sale, or purchase of payment card information, a testing of payment card information to ensure validity of the payment card information, a use of payment card information to make significant fraudulent transactions, or an attempt to accomplish any such action. As used herein, the term "significant fraud" may refer to any use of payment card information to make fraudulent transactions other than test transactions, as defined further herein.

As used herein, the term "fraudster" may refer to anyone who practices fraud with regard to payment card information. Therefore, fraudsters may include thieves, black market sellers, black market buyers, fraudulent testers (or simply "testers"), and fraudulent users of the payment card information. It will be appreciated that the same fraudster could play multiple of these roles, several different fraudsters could play these roles, and not every role will necessarily be played each time payment card information is stolen.

As used herein, the term "cardholder" may refer to the owner or rightful possessor of a payment card. As used herein, the term "cardholder account" may refer specifically to a PAN or more generally to an account a cardholder has with the payment card issuer and that the PAN is or was associated with. As used herein, the term "merchant" may refer to a business, a charity, or any other such entity that can generate transactions with a cardholder account through a payment card network.

As used herein, the terms "compromise" and "fraudulent compromise" may refer to the occurrence of fraud (as defined above) associated with a merchant or a cardholder account. As used herein, the terms "compromised cardholder account," "compromised PAN," "compromised payment card," and "compromised payment card information" may refer to a cardholder account that has experienced fraud (e.g., theft of payment card information, testing transactions, significant fraud, and so forth). As used herein, the term "compromised merchant" may refer to a merchant that has experienced fraud with regard to payment card information (e.g., a security breach involving payment card information, testing transactions, significant fraud, and so forth). In some embodiments of the disclosed fraud detection system, the fraud detection system may only consider a merchant to be compromised when fraud occurs of certain types or that meets a threshold quantity, frequency, percentage of transactions, or percentage of transaction amounts (e.g., any security breach involving payment card information, a hundred testing transactions in 24 hours, significant fraud occurring at least once a week, having 0.5% of transactions be fraudulent in the last month, having 1% of attempted transaction amounts be fraudulent in the last two weeks, and so forth).

When fraudsters steal payment card information, they sometimes steal large quantities of payment card information at a time. For example, a fraudster may steal a block of payment card information (e.g., payment card information for multiple payment cards) from a single merchant. Such security breaches can also be referred to as an account data compromise (ADC) event, or simply as a "hack."

Once payment card information is stolen or otherwise fraudulently obtained, it can be used in many unauthorized ways. For example, the payment card information could be used to generate unauthorized electronic payments, such as through an online store on the Internet. The payment card information could be used to generate unauthorized payments over the phone. Such online or over-the-phone payments are sometimes called "card not present fraud" or CNP fraud because a physical card is not used or presented to the merchant for examination. The payment card information could be used to print out a copy of the payment card (e.g., via a card printer) that can then be used for in-person transactions with just a swipe of the copied payment card. If the original payment card itself was stolen, that original payment card could simply be used.

Fraudsters can be patient. When stealing payment card information, thieves do not always use or sell stolen payment card information immediately after the theft. They may wait a period of time before using or selling the stolen payment card information. Black market buyers similarly may not use or sell the payment card information immediately. Further, multiple sales of the same payment card information may occur (e.g., in a chain of sales) before the payment card information is finally used by one of the black market buyers to make significant fraudulent transactions. The time delay between the theft of the payment card information, the various sales, and the eventual use of the payment card information for significant fraud can provide a window of time in which to detect that the cardholder account may be compromised (e.g., before significant fraudulent transactions are performed with the payment card).

Given the nature of this type of fraud, some of the stolen, sold, or purchased payment card information may be for invalid payment cards (e.g., fake, expired, or deactivated accounts). Some payment cards, for example, may have already been identified as compromised and, as such, may already have been deactivated. Accordingly, the thieves, black market sellers, or black market buyers of such payment card information may seek to determine whether certain accounts are currently valid. Often, to determine whether or not the payment card information is valid, the fraudsters may make "test" transactions using payment card information for one payment card, or for a whole a batch of payment cards, often for some small amount, before the payment card information is used for significant fraudulent transactions. If the test transaction is successful, the fraudster knows the payment card information is currently valid. If the test transaction is not successful, the fraudster knows the payment card information is likely invalid. As used herein, the terms "test," "testing," "test run," or "test event" may be used to refer to the act of making these test transactions.

Test transactions sometimes make use of a sham entity (e.g., a fake business or charity, sometimes called a "test merchant") to initiate the test transaction. These sham entities may be set up specifically for the purpose of generating fraudulent transactions such that, for example, the transaction appears to be a sale or a donation to a legitimate entity. Such sham entities may use a merchant name that makes the sham entity seem legitimate when a person (e.g., a cardholder) sees the transaction appear on a payment card statement (e.g., where the statement lists transactions and includes a merchant name for the one or more transactions). In other situations, the fraudster may use a legitimate merchant as the test merchant. Testers can buy real goods or services from a legitimate merchant with the stolen payment card information to see if the purchases are successful. In other cases, fraudsters may hack into a legitimate merchant's computer systems to generate fraudulent test transactions from within that system, thereby bypassing some of the inconvenience and security measures that the fraudsters might otherwise encounter in an ordinary transaction with that merchant.

Test transactions can vary in amount. Sometimes, to avoid raising suspicion, these test transactions are for small amounts, perhaps even under a dollar. With such a small change in an account balance, the legitimate parties associated with the stolen account (e.g., a cardholder or the payment card issuer) may not notice such a transaction. Other times, test transactions may be larger, such as when a fraudster purchases a real good or service as a test transaction or tries to make a transaction to a sham entity appear as if the transaction is for a somewhat more expensive good or service.

Fraud is sometimes detected by cardholders, payment card issuers and payment card associations or other parties concerned with the payment card information. Cardholders may notice suspicious transactions on a payment card statement and notify the payment card issuer or the merchant (e.g., to have transactions cancelled, to deactivate their account, and so forth). Payment card issuers and payment card associations sometimes discover certain types of suspicious activity, but it is not feasible to have people observe and analyze all transaction data that payment card issuers and payment card networks typically handle. Fraud may also be detected due to a security breach. Merchants sometimes discover security breaches on their own and self-report these incidents, indicating that payment card information for certain accounts may have been compromised during the breach. Law enforcement, through various means, sometimes discovers that a breach has occurred and notifies affected parties and the public of such breaches.

To provide a technical solution to the above technical problems, a fraud detection system and associated methods are provided. The systems and methods disclosed herein advantageously allow for the development of risk evaluation processes that can be used to detect accounts that have experienced test transactions by fraudsters, as well as fraud evaluation processes that allow transactions involving such compromised accounts or merchants to be evaluated for fraud (e.g., during authentication or authorization). In an example embodiment, the fraud detection system automatically analyzes transaction data and other supplemental data to identify suspicious activity and to automatically discover patterns that can be used to detect future fraud. The fraud detection system may consider historical and ongoing transaction data and, additionally or alternatively, external data sources containing information and intelligence regarding suspected fraud (e.g., information from cardholders, law enforcement, merchants, or issuers). Early detection of compromised accounts (e.g., during testing and before more substantial transactions are made) can reduce financial losses due to fraud by, for example, blocking compromised accounts or rejecting pending transactions after detection of the suspected compromise.

In one example embodiment, the fraud detection system is configured to automatically identify patterns indicative of fraud (e.g., early detection indicia of compromised accounts), and to use these patterns to create a set of compromise detection rules. The fraud detection system then uses the compromise detection rules to detect compromised merchants or cardholder accounts. The rules may include, for example, a merchant identifier, a transaction pattern, or a confidence level (e.g., how effective the rule may be at detecting fraud). The fraud detection system may notify or alert interested parties (e.g., issuers, merchants, cardholders, or law enforcement) that a particular cardholder account has been compromised, that a breach has been detected, or that a test event has been detected.

In addition, the fraud detection system may use a set of fraud risk rules to calculate the likelihood, for each particular compromised merchant or cardholder account, of that compromised merchant or compromised payment card being involved in future fraudulent transactions. While an account or merchant may be compromised (e.g., having been subject to a data breach, having experienced a test event), such exposure does not necessarily spoil all future transactions with that compromised merchant or account. For example, though account information may have been exposed during a data breach, the account may still be active, and the legitimate cardholder may still initiate legitimate transactions with their payment card. As such, the fraud detection system may evaluate (e.g., classify) compromised cardholder accounts or merchants based on how likely that compromised account or merchant is to be subject to future fraudulent activity. For example, for cardholder accounts classified as high-risk, the fraud detection system combines the calculated likelihood with a fraud risk transaction model. The resulting combined model is used to identify fraudulent transactions in real time and to direct the payment card network to reject those transactions. In other embodiments, authentication and authorization of transactions involving compromised merchants and cardholder accounts may be subject to tightened measures. Such creation and use of compromise detection rules and predictive fraud evaluation allows the payment network to evaluate transactions that are under suspicion of having been compromised without necessarily having to cancel the account itself, or without having to deny all transactions from a given merchant. Such measured discretion in fraud detection and fraud prevention provides heightened scrutiny on compromised accounts, while allowing legitimate transactions to complete and denying fraudulent transactions.

As used herein, the terms "payment card," "transaction card," and "financial transaction card" refer to any suitable payment card, such as a credit card, a debit card, a prepaid card, a charge card, a membership card, a promotional card, a frequent flyer card, an identification card, a gift card, or any other device that may hold payment card information, such as mobile phones, Smartphones, personal digital assistants (PDAs), key fobs, or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "real-time" and "real time" may be used, in some contexts, to refer to a regular updating of data within a system such as a fraud detection system, a server system, a client system, or the displays described herein. When a system is described as processing or performing a particular operation "in real time," this may mean within seconds or minutes of an occurrence of some trigger event, such as new data being generated, or on some regular schedule, such as every minute. In other contexts, some payment card transactions require "real-time" fraud operations, such as automatic rejection of attempted fraudulent transactions. Such real-time fraud operations may refer to operations performed during authentication or authorization of a payment card transaction (e.g., between the moment that a new payment card transaction is initiated from, for example, a merchant, and the time that an authorization decision is made, for example, back to that merchant). In such a context, "near real-time" fraud operations are operations conducted shortly after the payment card transaction has occurred (e.g., after an authorization decision is made).

As used herein, "machine learning" refers to statistical techniques to give computer systems the ability to "learn" (e.g., progressively improve performance on a specific task) with data, without being explicitly programmed for that specific task.

FIG. 1 is a schematic diagram illustrating an example multi-party payment processing system 120 for enabling payment-by-card transactions. Embodiments described herein may relate to a payment card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, New York).

As described with respect to system 120, a financial institution called the "issuer" (or "issuer bank") 130 issues a payment card or electronic payments account identifier, such as a credit card, to a consumer or cardholder 122, who uses the payment card to tender payment for a purchase from a merchant 124. To accept payment with the payment card, merchant 124 must normally establish an account with a financial institution that is part of the financial payment system. This financial institution is usually called the "merchant bank," the "acquiring bank," or the "acquirer." When cardholder 122 tenders payment for a purchase with a payment card, merchant 124 requests authorization from a merchant bank 126 for the amount of the purchase. The request may be performed over the telephone or online or by an in-person merchant manually typing in the payment card information into a computer system, but the request is frequently performed through the use of a point-of-sale (POS) terminal, which reads cardholder's 122 payment card information from a magnetic stripe, a chip, or embossed characters on the payment card and communicates electronically with the transaction processing computers of merchant bank 126. Alternatively, merchant bank 126 may authorize a third party to perform transaction processing on its behalf. In this case, the POS terminal will be configured to communicate with the third party. Such a third party is usually called a "merchant processor," an "acquiring processor," or a "third party processor."

Using an interchange network 128 (e.g., a payment processor such as Mastercard®), computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because payment card associations, such as Mastercard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the POS terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 or issuer bank 130 stores the payment card information, such as a category of merchant 124, a merchant identifier, a location where the transaction occurred, amount of purchase, date and time of transaction, in a database 216 (shown in FIG. 2).

After a purchase has been made, a clearing process occurs to transfer additional transaction data related to the purchase among the parties to the transaction, such as merchant bank 126, interchange network 128, and issuer bank 130. More specifically, during or after the clearing process, additional data, such as a time of purchase, a merchant name, a type of merchant, purchase information, cardholder account information, a type of transaction, itinerary information, information regarding the purchased item or service, or other suitable information, is associated with a transaction and transmitted between parties to the transaction as transaction data, and may be stored by any of the parties to the transaction. In the exemplary embodiment, when cardholder 122 purchases travel, such as airfare, a hotel stay, or a rental car, at least partial itinerary information is transmitted during the clearance process as transaction data. When interchange network 128 receives the itinerary information, interchange network 128 routes the itinerary information to database 216.

For debit card transactions, when a request for a personal identification number (PIN) authorization is approved by the issuer 130, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant bank 126, issuer bank 130, and an account merchant 124 related to the transaction. More specifically, a transaction is typically settled between issuer bank 130 and interchange network 128, and then between interchange network 128 and merchant bank 126, and then between merchant bank 126 and merchant 124. Usually, transactions are captured and accumulated into a "batch," which is settled as a group.

Figure 2:
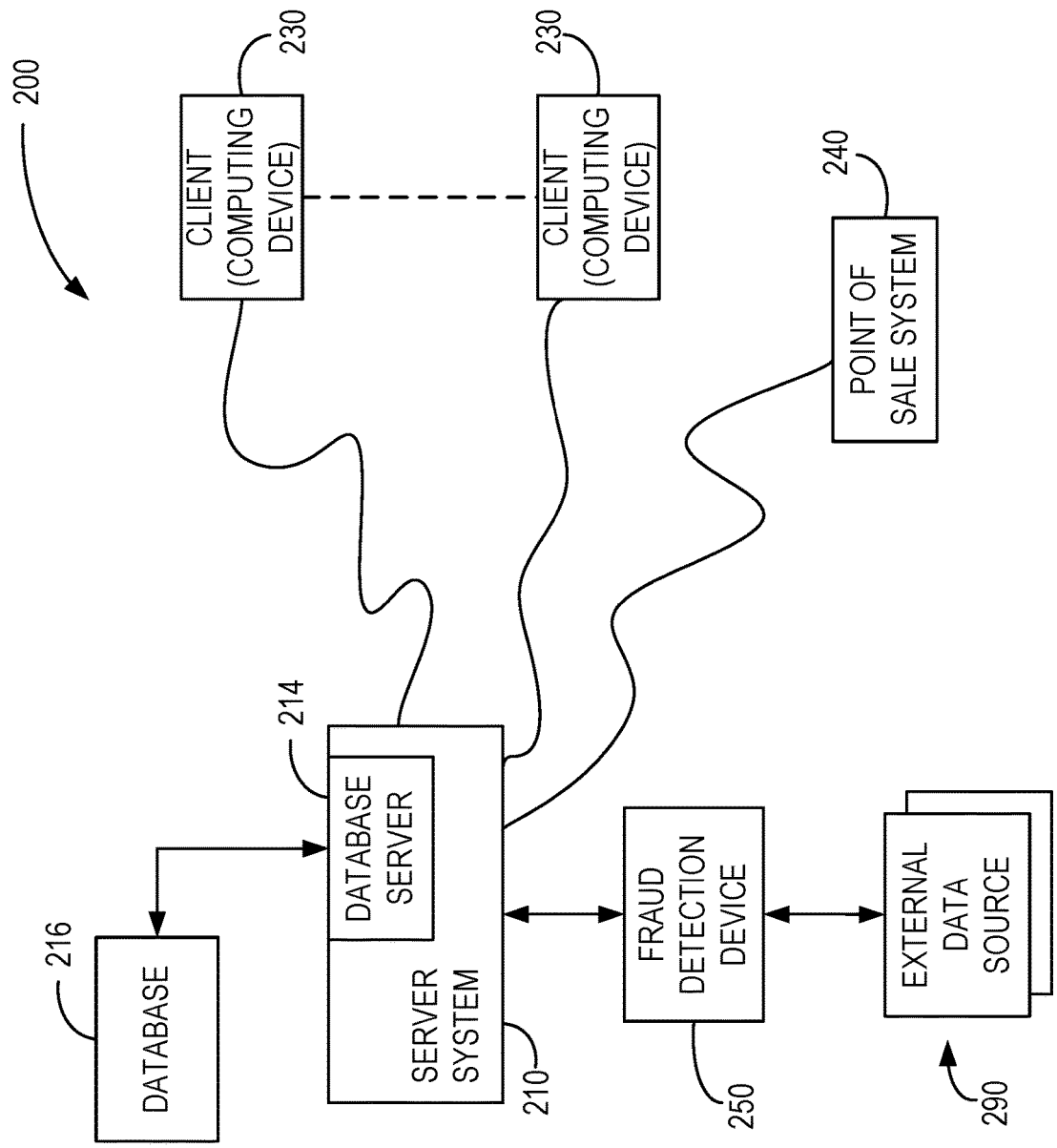

FIG. 2 is a simplified block diagram of an example fraud prevention system 200 used for detecting fraud in accordance with one example embodiment of the present disclosure. System 200 may be implemented in the performance of payment-by-card transactions received as part of processing cardholder transactions. In an example embodiment, system 200 is a payment processing system that includes a fraud detection device 250 configured to identify compromised merchants 124 and cardholder accounts (e.g., based on such merchants 124 or accounts 132 exhibiting indicia of test transactions), to evaluate risk of future fraud based on the compromise, and to use such risk as one aspect of an overall fraud evaluation of pending transactions (e.g., during authentication and authorization).

In the example embodiment, system 200 includes a server system 210 and multiple client systems 230. In some embodiments, client systems 230 include computers configured to implement a web browser or a software application, which enables client systems 230 to access server system 210 using the Internet. Client systems 230 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Alternatively, client systems 230 include any device capable of accessing the Internet including, but not limited to, a desktop computer, a laptop computer, a personal digital assistant (PDA), a cellular phone, a smartphone, a tablet, a phablet, or other web-based connectable equipment. In the example embodiment, client systems 230 may be computing devices associated with one of cardholder 122, merchant 124, bank 126, or issuer 130.

In one embodiment, server system 210 includes a database server 214 that is communicatively coupled to a database 216 for storing data. In an exemplary embodiment, database 216 stores transaction information from a plurality of cardholders and paths based on the individual transactions. According to the exemplary embodiment, database 216 is disposed remotely from server system 210. In other embodiments, database 216 is decentralized, or may be a portion of server system 210. In the exemplary embodiment, a user (not shown) is able to access database 216 through client systems 230 by logging onto server system 210. In the example embodiment, server system 210 may be associated with interchange network 128.

System 200 further includes one or more POS systems 240 that are communicatively coupled with the server system 210. POS systems 240 may be, for example, merchants 124 as shown in FIG. 1, and are communicatively coupled with server system 210 through payment network 120. POS systems 240 may include, without limitation, machines that accept card swipes, machines that accept chip card insertions, online payment portals, digital wallet payments, or stored payment card numbers for recurring transactions.

In the example embodiment, server system 210 is associated with a financial transaction interchange network, such as interchange network 128 shown in FIG. 1, and is also referred to as an interchange computer system. In some embodiments, server system 210 is used for processing transaction data and analyzing for fraudulent transactions. In one embodiment, at least one of client systems 230 includes a computer system associated with issuer 130 of a transaction payment card. Accordingly, server system 210 and client systems 230 may be used to process transaction data relating to purchases cardholder 122 makes using a payment card processed by the interchange network and issued by the associated issuer 130. In the exemplary embodiment, at least one client system 230 may be associated with a user or cardholder 122 seeking to register, access information, or process a transaction with at least one of the interchange network, the issuer 130, or the merchant 124. In addition, client systems 230 or POS systems 240 may include individual POS devices (not shown) associated with merchant 124 and used for processing payment transactions. In an alternative embodiment, at least one client system 230 is utilized for investigating potential breaches.

In the example embodiment, fraud detection device 250 is communicatively coupled with server system 210. Fraud detection device 250 can access server system 210 to store and access data and to communicate with the client systems 230 through server system 210. In some embodiments, fraud detection device 250 may be associated with or part of interchange network 128, or in communication with payment network 120, shown in FIG. 1. In other embodiments, fraud detection device 250 is associated with a third party and is in electronic communication with the payment network 120. In some embodiments, fraud detection device 250 may be associated with, or be part of merchant bank 126, interchange network 128, and issuer bank 130, all shown in FIG. 1.

Fraud detection system 250, in the example embodiment, accesses historical payment transaction information of cardholder accounts 132 and merchants 124 from server system 210 and database 216. Some accounts are known to have been compromised in the past. For example, cardholders 122 may report fraudulent transactions on their accounts 132, or the network 128 may have detected fraudulent transactions on compromised accounts 132, or blocks of account numbers may be known to have been compromised in a data breach. Fraud detection device 250 analyzes such historical data of known compromised accounts for indicia or patterns involving test transactions that may have been conducted or attempted on the compromised accounts 132 (e.g., before the account 132 was disabled, or prior to detecting the compromise), such as small ticket transactions, cross-border transactions, and theoretical common point of purchase (TCPP). Fraud detection system 350 uses such data to generate a set of compromise detection rules that may then be used to detect compromised accounts when those accounts exhibit similar indicia.

In some embodiments, fraud detection device 250 is communicatively coupled to one or more external data sources 290, and may use data from external data sources 290 as additional indicia with regard to whether. External data sources 290 may be private, restricted-access data sources (e.g., a computer system maintained by merchant 124, issuer 130, payment card association, law enforcement, journalism organization, government agency, or another party with information helpful for detecting fraud) or may be a publicly available or only partially restricted data source (e.g., a data source accessible on the Internet, such as social media, the "dark web," or other data "in the wild"). Fraud detection device 250 may retrieve information from external data sources 290 to help identify compromised accounts 132 and merchants 124. The identified accounts 132 or merchants 124 may then, for example, be gathered into a compromise detection file (not shown) or database 216, referred to herein as compromise detection data.

In the example embodiment, fraud detection device 250 further processes the compromise detection data to evaluate a likelihood of those accounts 132 or merchants 124 being used in subsequent fraudulent transactions. In some situations, while an account may be indicated as compromised by the fraud detection device 250, the risk of future fraudulent transactions may be low. For example, if the account 132 was part of a group of compromised accounts 132 that all experienced small ticket test transaction, but those transactions were conducted several years ago, and no subsequent fraudulent transactions have been reported on the account 132, then even though the account 132 may be compromised, the risk of a future fraudulent transaction may be determined to be low (e.g., given the nature of the compromise, the passage of time, and the absence of intervening fraudulent transactions). In contrast, if a test transaction on the account 132 was detected recently, then there a higher risk of future fraudulent activity. If the evaluated likelihood is above a fraud risk threshold, then fraud detection device 250 classifies the account 132 or merchant 124 as "high-risk." For cardholder accounts 132 classified as high-risk, in some embodiments, fraud detection device 250 may combine the evaluated likelihood with a fraud risk transaction model (e.g., as an additional factor to evaluate whether a pending transaction is fraudulent). In other embodiments, fraud detection device 250 may evaluate the pending transaction separately based on the fraud risk evaluation (e.g., as an independent test, perhaps in addition to other fraud risk evaluations). Fraud detection device 250 may use the such evaluations to identify fraudulent transactions in real time. Additionally or alternatively, fraud detection device 250 may use information from external data sources 290 to identify fraudulent transactions.

In some embodiments, fraud detection device 250 directs payment card network 130 to reject the identified fraudulent transactions based on this fraud risk evaluation (e.g., by not authenticating or authorizing the transactions). In some embodiments, fraud detection device 250 may implement tighter measures around the authentication and authorization of transactions involving compromised accounts (e.g., initiating a step-up authentication measure, one-time password, biometric authentication, security question, SMS message, or other 3DS measure). In another embodiment, fraud detection device 250 may transmit the compromise detection data to server system 210, to be stored in database 216 (e.g., marking the identified accounts as compromised, storing a value indicative of the determined likelihood of fraud in light of the test transactions). Client system 230 may access the compromise detection data from database 216. In some embodiments, fraud detection device 250 may be configured to notify or alert client system 230 (e.g., cardholder 122, merchant 124, issuer 130) that an account or group of accounts has been compromised or that merchant 124 has been compromised.

Figure 3:
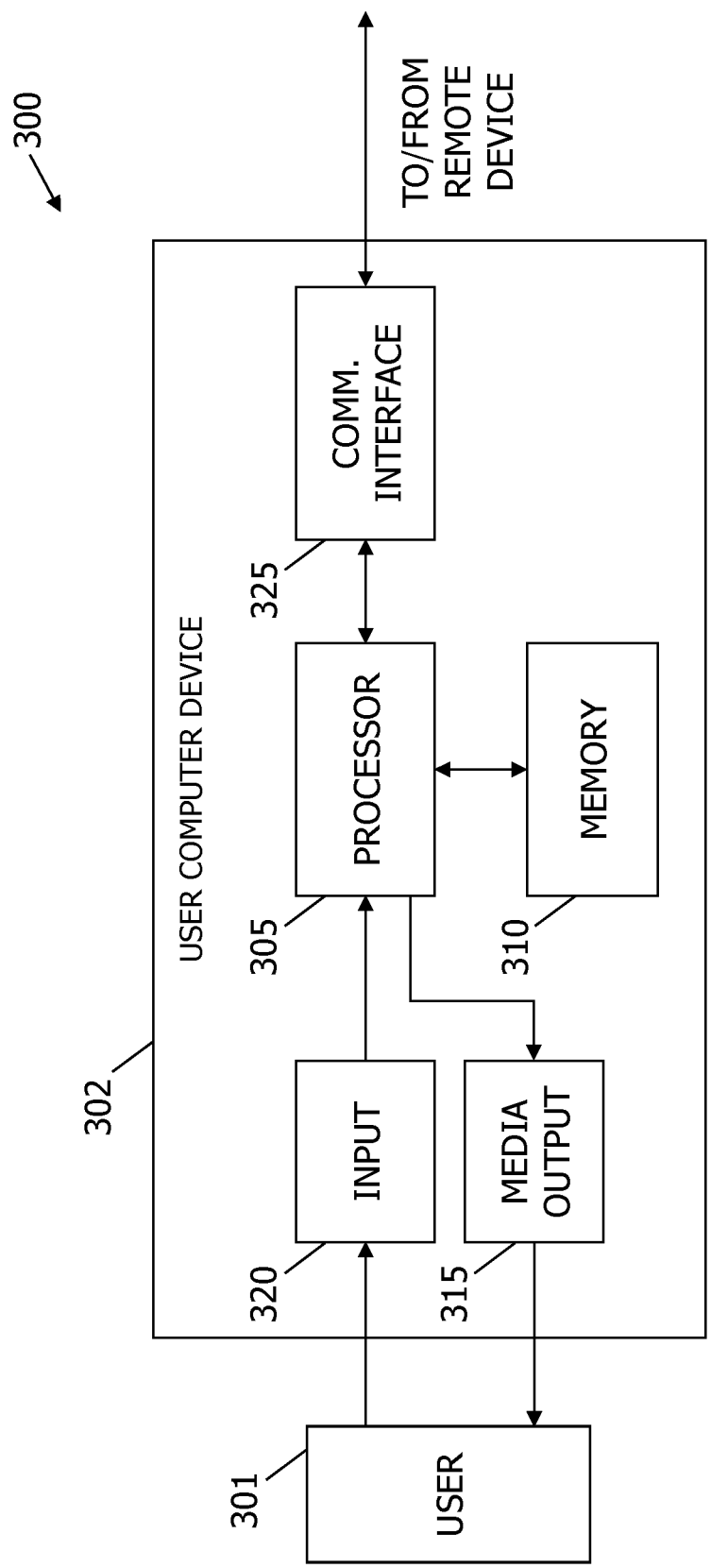

FIG. 3 illustrates an example configuration of a client system 300 in accordance with one embodiment of the present disclosure. In the example embodiment, client system 300 includes at least one user computer device 302, operated by a user 301. User computer device 302 may be representative of client systems 230 or fraud detection device 250 (both shown in FIG. 2). User computer device 302 includes a processor 305 for executing instructions, and a memory area 310. In some embodiments, executable instructions are stored in memory area 310. Processor 305 may, for example, include one or more processing units (e.g., in a multi-core configuration). Memory area 310 may, for example, be any device allowing information such as executable instructions or transaction data to be stored and retrieved. Memory area 310 may further include one or more computer readable media.

In the example embodiment, user computer device 302 further includes at least one media output component 315 for presenting information to user 301. Media output component 315 may, for example, be any component capable of converting and conveying electronic information to user 301. In some embodiments, media output component 315 includes an output adapter (not shown), such as a video adapter or an audio adapter, which is operatively coupled to processor 305 and operatively coupleable to an output device (also not shown), such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 is configured to include and present a graphical user interface (not shown), such as a web browser or a client application, to user 301. The graphical user interface may include, for example, an online store interface for viewing or purchasing items, or a wallet application for managing payment information. In some embodiments, user computer device 302 includes an input device 320 for receiving input from user 301. User 301 may use input device 320, without limitation, to select or enter one or more items to purchase or request to purchase, to access credential information, or to access payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, or an audio input device. A single component such as a touch screen may function as both an output device of media output component 315 and input device 320.

In one embodiment, user computer device 302 further includes a communication interface 325, communicatively coupled to a remote device such as server system 210 (shown in FIG. 2). Communication interface 325 may include, for example, a wired or wireless network adapter or a wireless data transceiver for use with a mobile telecommunications network.

In the example embodiment, memory area 310 stores computer readable instructions for providing a user interface to user 301 through media output component 315 and, optionally, for receiving and processing input from input device 320. A user interface may include, among other possibilities, a web browser or a client application. Web browsers enable users, such as user 301, to display and interact with media and other information typically embedded on a web page or a website from server system 210. A client application allows user 301 to interact with, for example, server system 210. For example, instructions may be stored by a cloud service, and the output of the execution of the instructions sent to the media output component 315.

Figure 8:
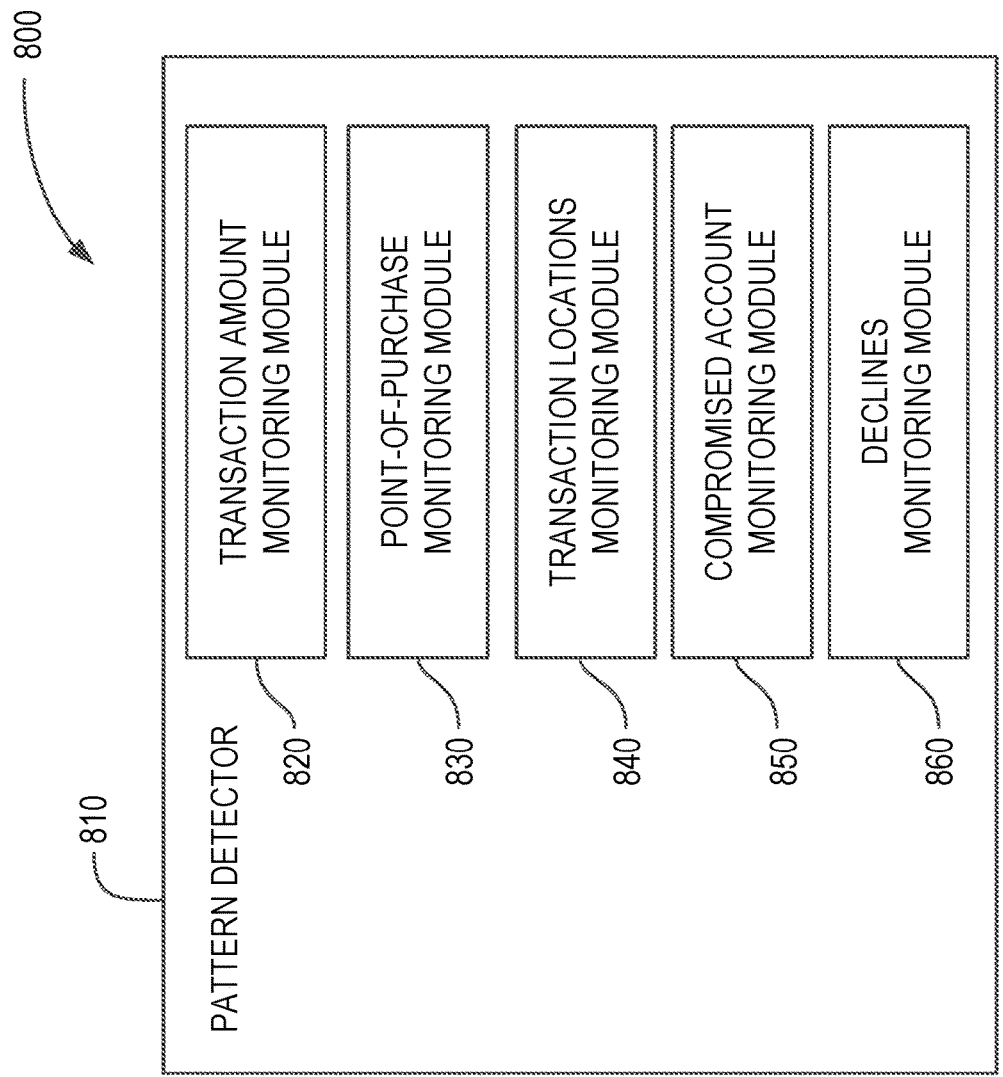
Figure 9:
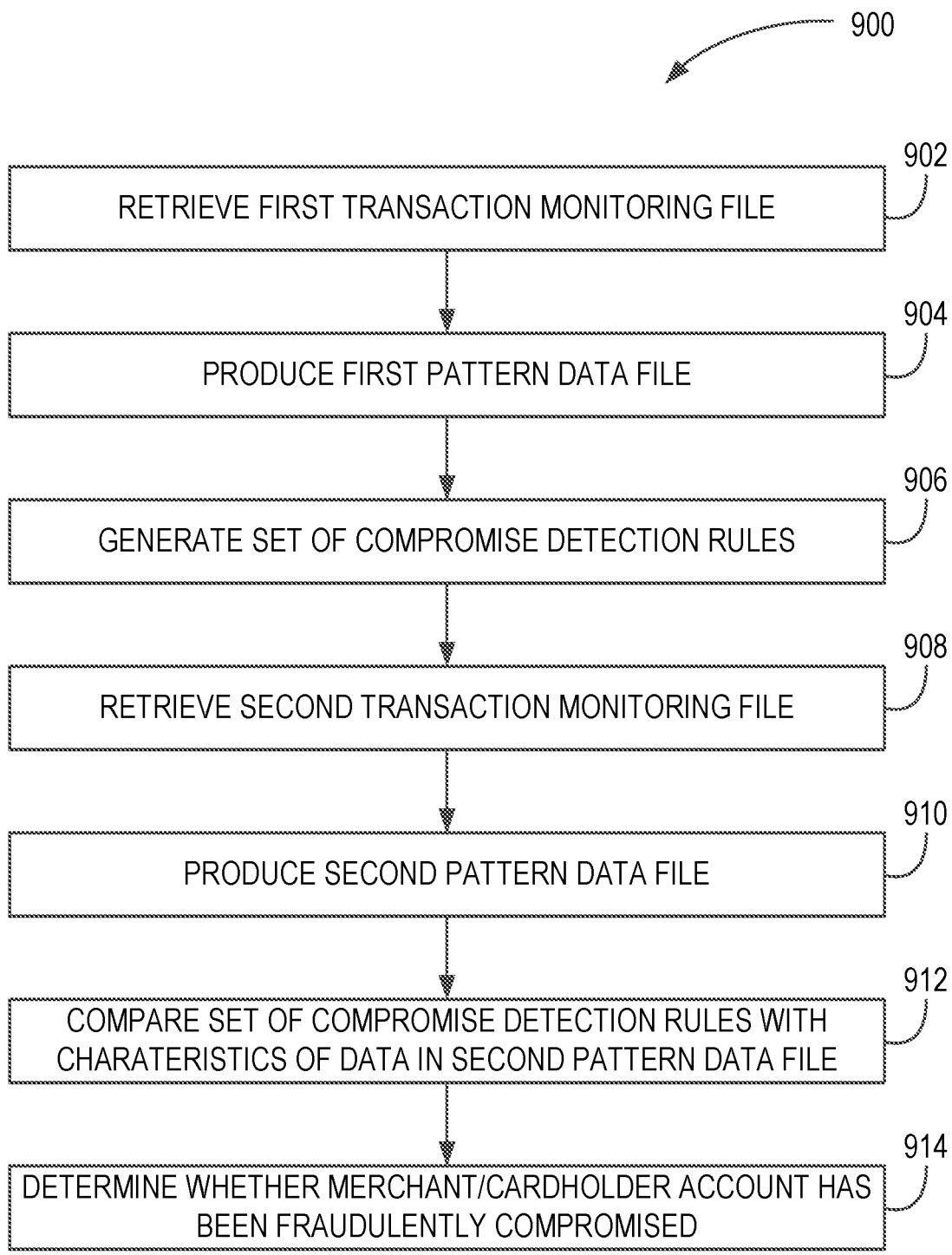
Figure 10:
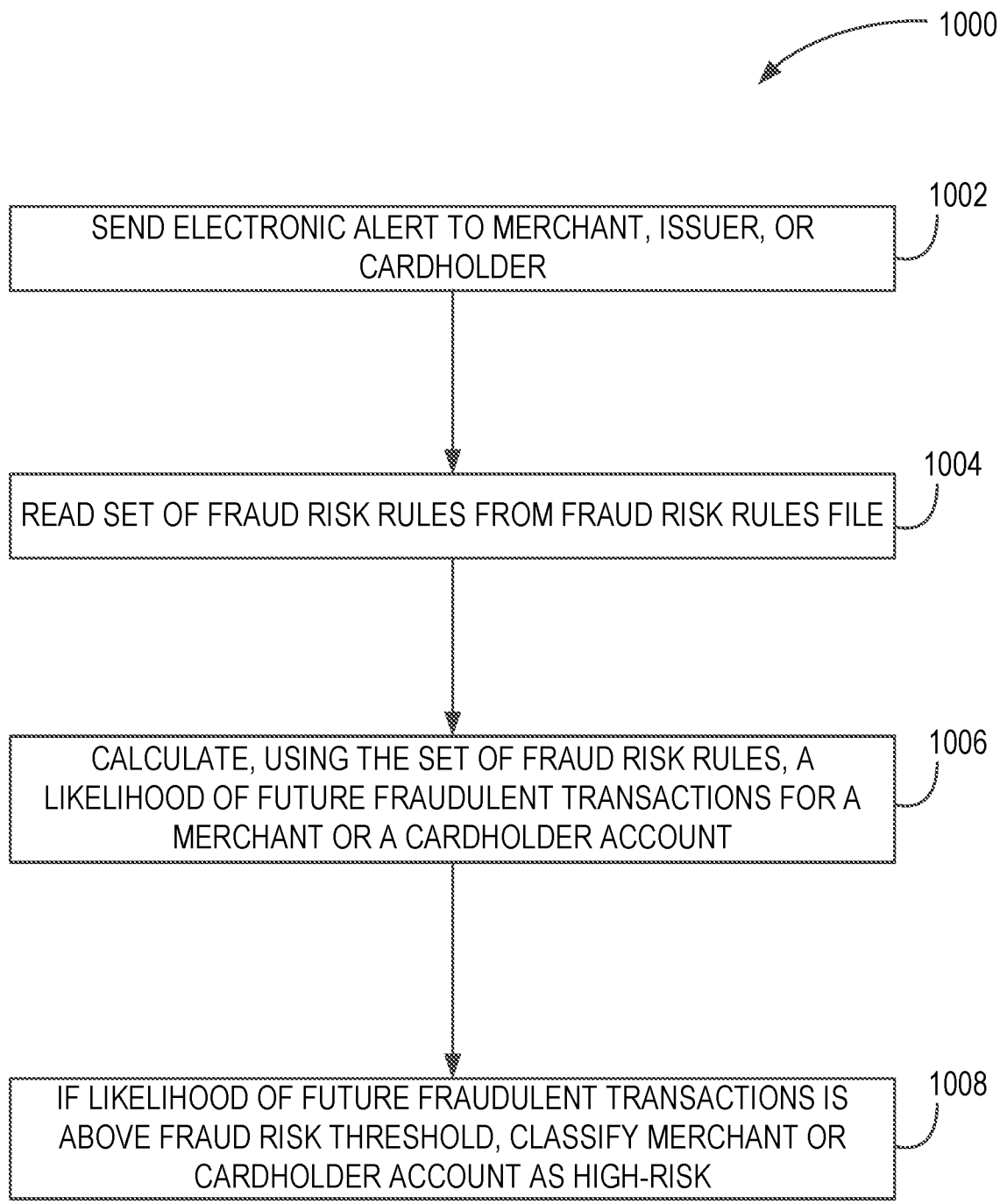

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 may be programmed with instructions such that it may execute the processes as illustrated in FIGS. 8, 9, and 10, below.

Figure 4:
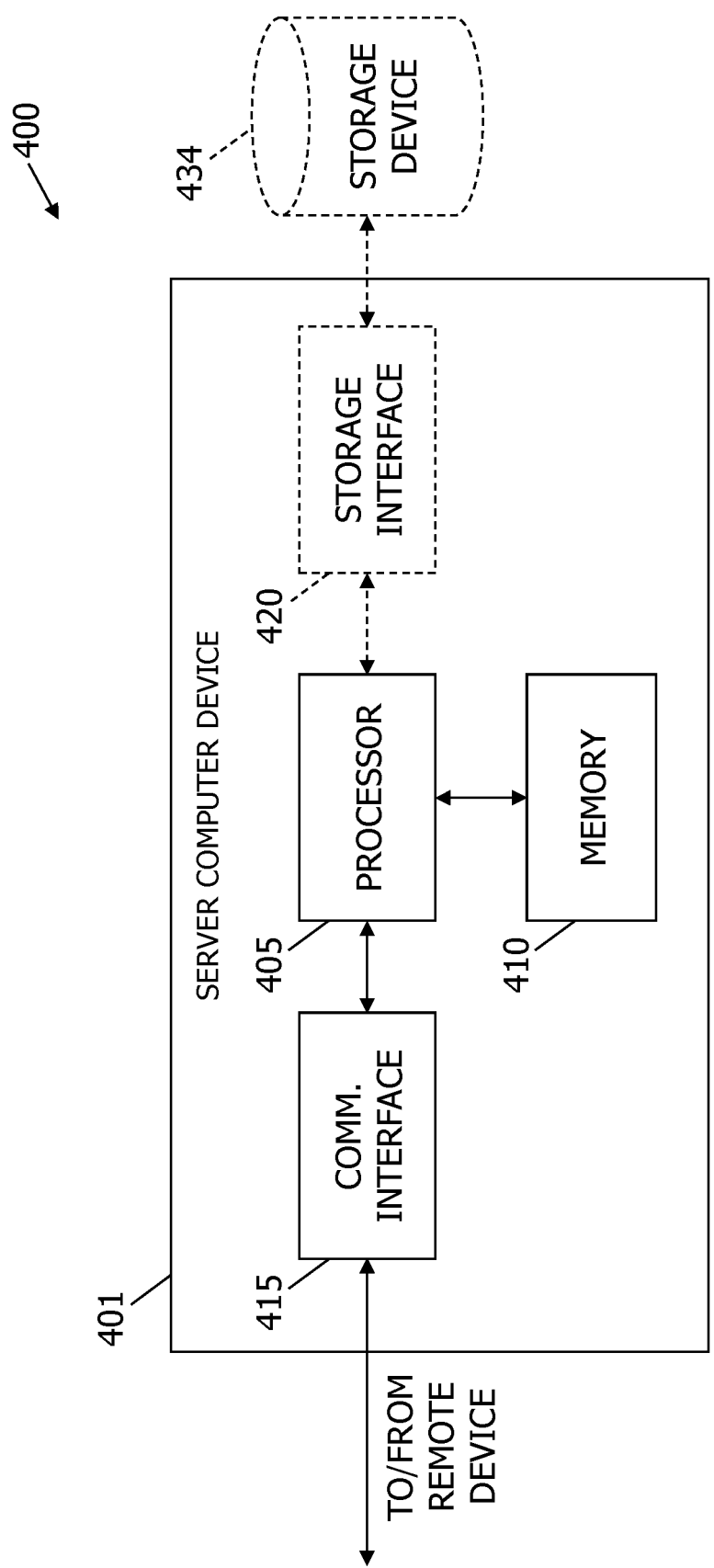

FIG. 4 illustrates an example configuration of a server system 400, in accordance with an embodiment of the present disclosure. In the example embodiment, server system 400 includes at least one server computer device 401, in electronic communication with at least one storage device 434. Server computer device 401 may be representative of server system 210 and database server 214 (shown in FIG. 2). In the exemplary embodiment, server computer device 401 includes a processor 405 for executing instructions (not shown) stored in a memory 410. In an embodiment, processor 405 may include one or more processing units (e.g., in a multi-core configuration). The instructions may be executed within various different operating systems on the system 401, such as UNIX®, LINUX® (LINUX is a registered trademark of Linus Torvalds), Microsoft Windows®, etc. It should also be appreciated that upon initiation of a computer-based method, various instructions may be executed during initialization. Some operations may be required in order to perform one or more processes described herein, while other operations may be more general or specific to a particular programming language (e.g., C, C #, C++, Java, or other suitable programming languages, etc.).

In the example embodiment, processor 405 is operatively coupled to a communication interface 415 such that system 400 is capable of communicating with a remote device such as a user system or another system 400. For example, communication interface 415 may receive requests from client system 300 (FIG. 3) via the Internet, within the scope of the embodiment illustrated in FIG. 4.

In the example embodiment, processor 405 is also operatively coupled to a storage device 434, which may be, for example, a computer-operated hardware unit suitable for storing or retrieving data. In some embodiments, storage device 434 is integrated in system 400. For example, system 400 may include one or more hard disk drives as storage device 434. In other embodiments, storage device 434 is external to system 400 and may be accessed by a plurality of systems 400. For example, storage device 434 may include multiple storage units such as hard disks or solid state disks in a redundant array of inexpensive disks (RAID) configuration. Storage device 434 may include a storage area network (SAN) or a network attached storage (NAS) system.

In some embodiments, processor 405 is operatively coupled to storage device 434 via an optional storage interface 420. Storage interface 420 may include, for example, a component capable of providing processor 405 with access to storage device 434. In an exemplary embodiment, storage interface 420 further includes one or more of an Advanced Technology Attachment (ATA) adapter, a Serial ATA (SATA) adapter, a Small Computer System Interface (SCSI) adapter, a RAID controller, a SAN adapter, a network adapter, or a similarly capable component providing processor 405 with access to storage device 434.

Memory area 410 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program.

Figure 5:
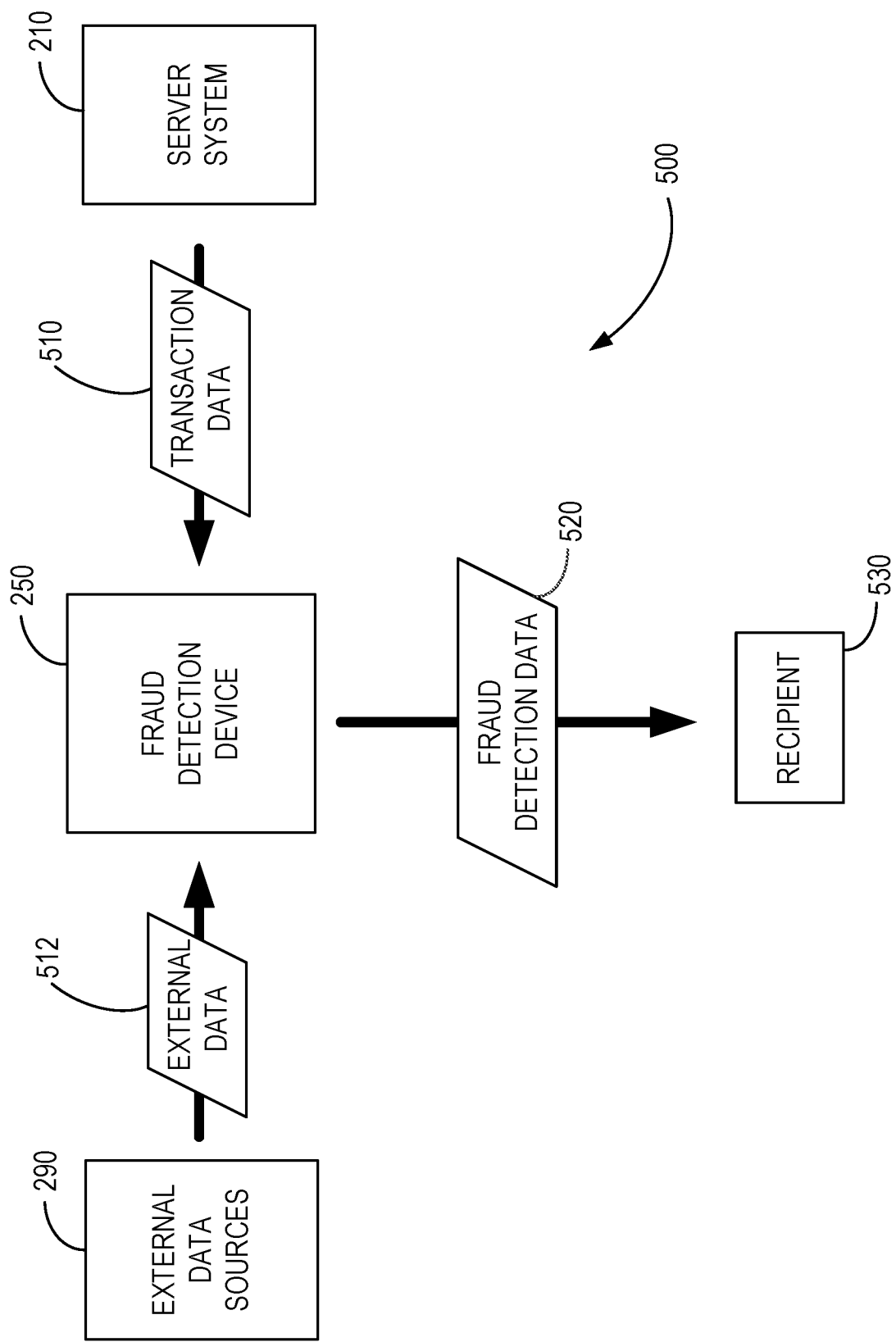

FIG. 5 illustrates an example data flow diagram 500 involving the fraud detection device 250 and system 200, in accordance with an embodiment of the present disclosure. In the example embodiment, fraud detection device 250 receives transaction data 510 from server system 210. Transaction data 510 may include transactions associated with accounts 132 or merchants 124 that have been previously identified as being impacted by fraud, transactions for accounts 132 or merchants 124 that are presently marked as compromised, or transactions related to accounts 132 or merchants 124 to be analyzed for fraud as described herein. Such transaction data 510 may include, for example, a PAN of the account 132, a merchant identifier (e.g., of merchant 124), a transaction amount, date and time of the transaction, a location where the transaction occurred, a merchant location, issuer information (e.g., a location of issuer 130), an address associated with the cardholder 122, travel itinerary information associated with the cardholder 122, and the kind of merchant (e.g., a Merchant Category Code or MCC according to ISO 18245).

The transaction data 510 may also include cardholder data for cardholder 122 such as, for example, cardholder 122's transaction history, cardholder 122's average volume of transactions, the variability of cardholder 122's volume of transactions, the time in between transactions from cardholder 122, identified past payments at a merchant where a breach is known or suspected, identified past payments to a merchant known or suspected to be a test merchant or a testing site, attempts to complete a transaction by switching the payment card label, and transaction failure notifications on the cardholder account 132 (e.g., wrong billing address, wrong security code, wrong PIN code, wrong zip code). The transaction data may also include, for one or more merchants 124, merchant 124's transaction history, the average volume of transactions at merchant 124, the variability of the merchant 124's volume of sales, and the time in between transactions by the merchant 124.

Fraud detection device 250 may also receive external data 512 from an external data source 290. In an alternative embodiment, server system 210 may receive external data 512 from external data source 290 and transmit external data 512 to fraud detection device 250. In the example embodiment, external data 512 may include a list of merchants where a breach is known or suspected, information regarding a known or suspected breach (e.g., level of certainty that the breach occurred, timing of the breach, timing of discovery of the breach, source of the breach, method of the breach), a list of merchants known or suspected to be a test merchant or a testing site, information regarding known or suspected testing activity (e.g., level of certainty that the testing activity occurred, timing of the testing activity, timing of discovery of the testing activity, source of the testing activity, method of the testing activity), a list of payment card information known or suspected to be compromised, information regarding known or suspected compromises of payment card information (e.g., level of certainty that the payment card information was compromised, timing of discovery of the compromise, number of payment cards associated with the compromise, timing of the last detected fraudulent transaction by a payment card associated with the compromise, number of detected fraudulent transactions by payment cards associated with the compromise within a defined time frame), financial reporting data for one or more merchants 124, a list of network traffic volume for a particular network or region of a network, a list of anomalies in such network traffic volume, or other information that may help to identify compromised accounts.

Fraud detection device 250 processes the transaction data 510 and external data 512, and produces fraud detection data 520. Fraud detection device 250 outputs fraud detection data 520 to one or more recipients 530. Recipient 530 of fraud detection data 520 may, in some embodiments, be the same device as or included in server system 210, a client system 230 (shown in FIG. 2), or an external data source 290 (e.g., payment network 130, merchant 124, cardholder 122). Alternatively, fraud detection device 250 may include media output component 315 (shown in FIG. 3) or use media output component 315 to output audio or video to user 301 (shown in FIG. 3). In such an embodiment, one recipient 530 would be user 301 (e.g., a payment analyst of payment network 130, an employee of merchant 124). In other embodiments, recipient 530 may be POS system 240 (shown in FIG. 2).

Fraud detection data 520 may include a list of compromised accounts (e.g., compromise detection data), an alert regarding a particular account or group of accounts, a list of compromised merchants, a list of test merchants or testing sites, an alert regarding a merchant 124, a list of issuers with a high quantity of compromised accounts, an alert to such issuers 130 regarding the testing transactions involving their accounts 132 (e.g., as an indication of a security breach), a command to other systems to implement tightened measures around an account (e.g., implementation of step-up authentication measures), a rejection of a transaction (e.g., because it has been identified as high risk), an acceptance of a transaction (e.g., because it has been cleared as low risk), a set of patterns and a measure of their usefulness for detecting fraud, a pattern or set of patterns for use in future fraud detection, or other useful information produced by the fraud detection system upon analysis of the received information.

Figure 6:
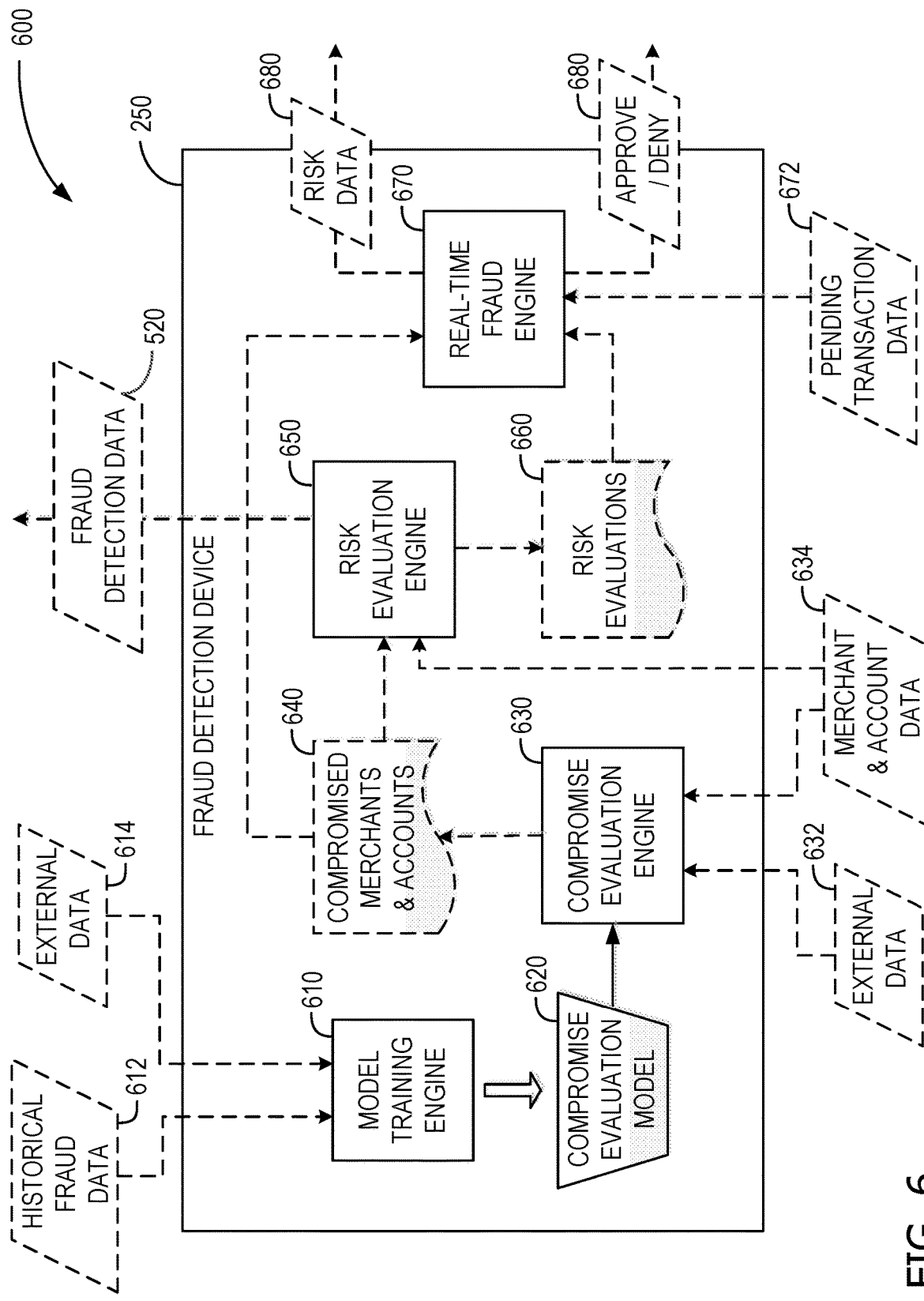

FIG. 6 is a component diagram 600 of fraud detection device 250 and associated data flow, in accordance with an example embodiment of the present disclosure. In FIG. 6, data flow and data components are shown in broken line and components of fraud detection device 250 are shown in solid line. In the example embodiment, fraud detection device 250 includes a model training engine 610, a compromise evaluation engine 630, a risk evaluation engine 650, and a real-time fraud engine 670.

In the example embodiment, model training engine 610 constructs (e.g., builds) a compromise evaluation model 620 from various inputs (e.g., training data), such as historical fraud data 612 and external data 614. Historical fraud data 612 may be similar to transaction data 510 (shown in FIG. 5), and external data 614 may be similar to external data 512 (shown in FIG. 5). In the example embodiment, historical fraud data 612 includes transaction data involving accounts 132 or merchants 124 known to have been compromised. Such transaction data may include, for example, PAN of account 132, a merchant identifier of merchant 124, a transaction value, a transaction date or time, a transaction location, a location associated with a travel itinerary of cardholder 122, or a location of merchant 124 or issuer 130 (e.g., city, state, country). Some of the included transactions may be transactions that are known to have been (e.g., flagged as) test transactions initiated by fraudsters. Historical fraud data 612 may also include cardholder data of cardholder 122 such as, for example, residence information (e.g., city, state, country) or historical transaction trend data (e.g., average transaction amount, common transaction locations).

In some embodiments, historical fraud data 612 includes an identified common point of purchase (CPP) for one or more sets of test transactions. For example, historical fraud data 612 may include labeled transactions (e.g., labeled as test transactions, cross-border transactions, CPP transactions, small-ticket transactions, or otherwise as being fraudulent, or any combination thereof) and, in some embodiments, also labeled with shared CPPs (e.g., a particular merchant for which many test transactions were conducted). In some embodiments, historical fraud data 612 includes transactions labeled as test transactions with small values ("small ticket transactions"). For example, historical fraud data 612 may include transactions labeled as test transactions and also labeled as being a small ticket transaction (e.g., one or multiple test transactions in which the fraudsters submitted small value transactions during testing). In some embodiments, historical fraud data 612 includes transactions labeled as cross-border test transactions. For example, the fraudster may have submitted multiple test transactions from a merchant in Mexico to charitable organizations in the United States. Some historical fraud data 612 may be labeled with multiple types of testing (e.g., both cross-border and CPP, or both CPP and small ticket, and so forth).

In the example embodiment, model training engine 610 trains a single "hybrid" compromise evaluation model 620 using historical fraud data 612 that includes test transactions of multiple different types (e.g., CPP, small ticket, and cross-border transactions). As such, the hybrid compromise evaluation model 620 may identify test transactions based on one or multiple types of testing. Alternatively, or in addition to the hybrid model 620, in some embodiments, model training engine 610 may construct compromise evaluation models 620 tailored to detect specific types of test transactions. For example, model training engine 610 may train one compromise evaluation model 620 to detect test transactions based on common points of purchase by using historical fraud data 612 primarily focused on CPP (e.g., as opposed to small ticket transactions or cross-border transactions). Once trained, such a model can identify test transactions based in part on use of a CPP. For another example, model training engine 610 may train one compromise evaluation model 620 to detect test transactions based on small ticket transactions by using historical fraud data 612 primarily focused on test transactions with small values. Once trained, such a model can identify test transactions that use small transaction values. Similarly, model training engine 610 may train another compromise evaluation model 620 to detect transactions based on cross-border transactions. Creating tailored models 620 for different types of testing provides a model that may be better tuned to detect test transactions of a particular type. Use of the hybrid model 620 allows multiple indicia of test transactions to potentially influence whether test transactions are identified. In some embodiments, compromise evaluation engine 630 may utilize the hybrid model 620 and each of the tailored models 620 to evaluate transactions.

Historical fraud data 612 and, optionally, external data 614, are used as training data to train compromise evaluation model 620. When trained, compromise evaluation model(s)

620 are configured to evaluate merchant and account data 634 of a particular account 132 or merchant 124 (e.g., unlabeled data) to determine whether that account 132 or merchant 124 has experienced one or more test transactions and, as such, is compromised. In the example embodiment, compromise evaluation engine 630 utilizes compromise evaluation model 620 to evaluate transactions involving accounts 132 and merchants 124 to make a compromise determination.

For example, compromise evaluation engine 630 may identify a subject account 132 for compromise evaluation. Compromise evaluation engine 630 retrieves historical transaction data (e.g., the most recent day, week, or month of transaction data for the subject account 132), account data, or customer data (e.g., as merchant and account data 634 from server system 210) for use in evaluating the subject account 132. Compromise evaluation engine 630 applies the merchant and account data 634 to one or more of the models 620 (e.g., to the hybrid model 620), on a transaction-by-transaction basis, to determine if any of the transactions involving the subject account 132 are identified by the model(s) 620 as test transactions. In one embodiment, if any of the transactions are identified by the hybrid model 620 as a test transaction, the subject account 132 is marked as a compromised account 640. In another embodiment, if a particular transaction is identified as a test transaction of a particular type (e.g., CPP, small ticket, or cross-border) by the hybrid model 620, the compromise evaluation engine 630 may apply that same transaction to the tailored model 630 for that type (e.g., if flagged by the hybrid model 620 as a cross-border test transaction, apply the transaction to the cross-border model 620). If the tailored model 620 also identifies the transaction as a test transaction of that type, then the subject account 132 is marked as a compromised account 640. Compromised merchants and accounts 640 represent those merchants 124 and account 132 that have been marked by compromise evaluation engine 630 as compromised based on automatic detection of one or more test transactions to the accounts 132. In some embodiments, fraud detection device 250 may update account information for account 132 (e.g., on database 216) to flag the compromised merchants and accounts 640 as compromised.

In the example embodiment, risk evaluation engine 650 evaluates compromised merchants and accounts 640 to determine a likelihood of future fraud (e.g., given the nature of the test transaction compromise, or other considerations). Each compromised merchant and account 640 is scored based on one or more risk indicia, some of which may be related to test transactions and the compromise evaluation discussed above. The risk score is categorized, in the example embodiment, as either "high risk" or "low risk" based on the risk score. For example, if the risk score for a particular account is above a pre-determined risk threshold, then the risk evaluation 660 for that compromised account is considered "high risk" (e.g., the account is substantially likely to experience future fraud, such as greater than 3% or greater than 5%). A risk evaluation 660 is generated for each compromised merchant and account 640. In some embodiments, fraud detection device 250 may update account information for the compromised merchant or account 640 (e.g., on database 216) with the risk evaluation 660, and optionally with the risk score. In some embodiments, risk evaluation engine 650 transmits fraud detection data 520 (e.g., compromised merchants and accounts 640, risk evaluations 660) to recipients 530.

In some embodiments, one of the risk indicia used to score the compromised merchant or account 640 is how long ago the test transaction occurred. For example, if a test transaction was recently conducted, this indicates a significant risk that the fraudster is still actively considering using the compromised merchant or account 640 for fraudulent activity in the near future. If the test transaction is older (e.g., 6 or 12 months old), and if no intervening testing or fraudulent activity on the compromised account 640 has been identified, then the testing is somewhat dated or "stale," and thus may only represent a marginal risk that the fraudster may use the compromised merchant or account 640 in the future.

After the compromise evaluation has been performed by compromise evaluation engine 630 and risk evaluation has been performed by risk evaluation engine 650, compromised merchants and accounts 640 have been identified and assigned risk evaluations 660. Fraud detection device 650, in the example embodiment, uses risk evaluations 660 to evaluate pending transaction data 672 for a real-time transaction involving compromised merchants and accounts 640. More specifically, fraud detection device 250 receives pending transaction data 672 for a pending transaction (e.g., during authentication or authorization) and determines that the pending transaction data 672 involves a compromised merchant or account 640 (e.g., based on PAN or merchant ID).

Real-time fraud engine 670 accesses risk evaluation 660 for the compromised merchant or account 640. In some embodiments, fraud detection engine 250 approves or denies 680 the pending transaction based on determining that the pending transaction is "low risk" or "high risk", respectively. In other embodiments, fraud detection engine 250 transmits risk data 680 to a requesting device such as server system 210. Risk data 680 may include the risk evaluation 660 (e.g., "low risk" or "high risk"), or may include the risk score generated by risk evaluation engine 650.

In some embodiments, risk data 680 may be used by network 130 as a part of a comprehensive authentication and authorization system for reducing fraud by, for example, using risk data 680 as one factor in evaluating the pending transaction 672 for fraud. In other embodiments, fraud detection engine 250 perform additional fraud risk evaluation during authentication or authorization of the pending transaction. For example, fraud detection device 250 may include other models that evaluate pending transaction data 672 for fraud (e.g., based on factors other than indicia of test transactions), and risk data 680 may be used as one component or factor of that broader evaluation.

In some embodiments, fraud prevention system 200 may automatically perform hardware provisioning based on indicia of test transactions (e.g., as determined by fraud detection device 250). For example, some situations such as data breaches or detection of systemic test transaction events, may increase the computational burden needed to analyze accounts 132 or merchants 124. Building or rebuilding of models 620, performing compromise evaluation on blocks of exposed accounts, or bursts in test transactions in particular geographic regions, may add a processing burden on fraud detection device 250, server system 210, database 216, or other involved hardware devices. In some embodiments, hardware devices such as fraud detection device 250 may be implemented within a logical or virtual server environment. In such provisionable environments, the system may include hardware such as CPUs, memory, storage, or network devices that may be provisioned (e.g., allocated) into or out of a logical or virtual server that executes aspects of the fraud detection device 250. For example, fraud detection device 250 may be a virtual machine that is allocated four processors and 32 Gigabytes of memory during normal operation. Such provisionable environments may include excess idle resources that may be reprovisioned as needed, or may include functionality to move computing resources between logical or virtual machines. In some embodiments, new virtual machines may be provisioned or reprovisioned (e.g., to support the fraud detection device 250). Fraud detection engine 250 may leverage such computational resources to increase performance for a limited time.

During operation, in some example embodiments, fraud detection device 250 may detect an event that requires additional computational resources (e.g., additional processors or memory). For example, in response to detection of a data security breach implicating a block of ten thousand accounts 132, fraud detection device 250 may automatically initiate provisioning of additional computing resources. In some embodiments, fraud detection device 250 may identify resource needs based on the nature of the event. For example, fraud detection device 250 may reprovision one additional processor for evaluating the ten thousand accounts 132, or may reprovision two additional processors if models 620 are to be rebuilt. In some example embodiments, the determination of need for additional resources is based on additional computational resources to provide additional risk analysis or additional security steps for the identified accounts during authentication or authorization (e.g., step-up challenges, one-time passwords, security questions, biometric challenges, and so forth).

In some example embodiments, fraud detection device 250 may determine that additional computational resources are required based on current or projected load. For example, fraud detection device 250 may react to heavy load (e.g., typified by high CPU usage, high memory usage, high process wait times) by automatically provisioning additional resources based on the type of constraint.

Figure 7:
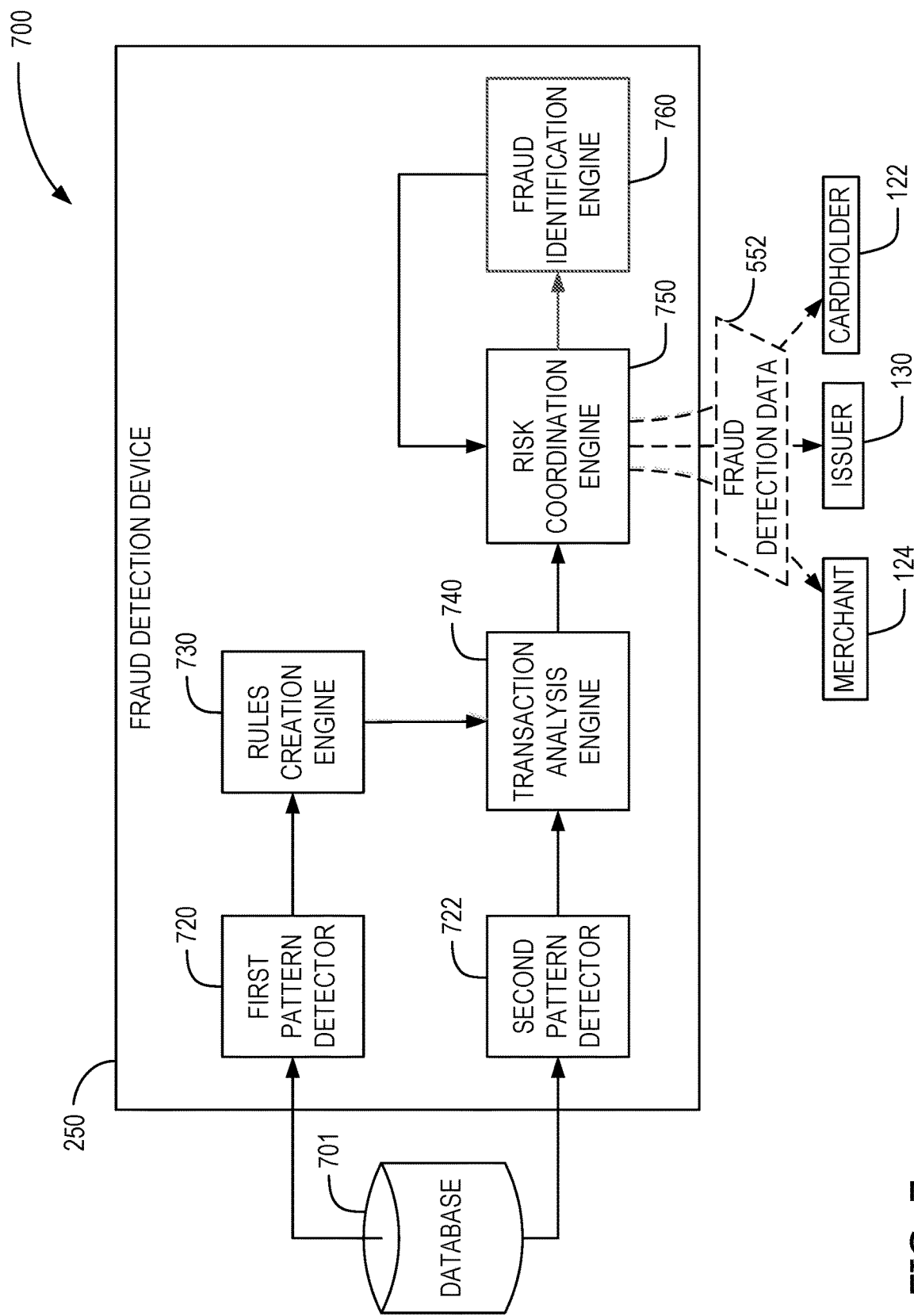

FIG. 7 is a component diagram 700 illustrating another example embodiment of fraud detection device 250. Components of fraud detection device 250 and associated operations shown and described with respect to FIG. 7 may be included or performed in addition to, or instead of, the components and processes shown and described with respect to FIG. 6. In the example embodiment, fraud detection device 250 includes first and second pattern detectors 720, 722, a rules creation engine 730, a transaction analysis engine 740, a risk coordination engine 750, and a fraud identification engine 760. In some embodiments, fraud detection device may include a database 701, or may otherwise communicate with database 701, which may be similar to database 216.

In the example embodiment, the first pattern detector 720 retrieves from database 701 a first transaction monitoring file including a first plurality of payment card transactions associated that includes at least one of a merchant and a cardholder account. First pattern detector 720 has several sub-modules (shown in FIG. 7) for detecting patterns. Using these sub-modules, first pattern detector 720 produces a first pattern data file based on the first plurality of payment card transactions. Each payment card transaction in the first plurality of payment card transactions includes a cardholder account, a merchant identifier, a transaction amount, a date and time of the transaction, and at least two locations from a merchant location, a transaction location, an issuer location, a cardholder address, and a location associated with a travel itinerary associated with the cardholder. Further, each payment card transaction in the first plurality of payment card transactions includes a level of certainty regarding whether the transaction is fraudulent. In the example embodiment, the first transaction monitoring file includes labeled payment card transactions selected to train rules creation engine 730. In an alternative embodiment, the first transaction monitoring file may include historical transaction data supplemented by information from external data 598 (shown in FIG. 5) (e.g., regarding whether the transaction was fraudulent).

Rules creation engine 730, in the example embodiment, is communicatively coupled to first pattern detector 720. Rules creation engine 730 generates a set of compromise detection rules based upon the first pattern data file. The set of compromise detection rules includes one or more of a merchant identifier, a transaction pattern, and a confidence level. The compromise detection rules will later be used to determine whether at least one of a merchant and a cardholder account has been compromised.

The example data flow 700 includes a first pattern detector 720 and a second pattern detector 722, but other embodiments of the present disclosure may have only one pattern detector or may have more than two pattern detectors. In the example embodiment, second pattern detector 722 retrieves a second transaction monitoring file including a second plurality of payment card transactions associated with at least one of a merchant and a cardholder account. In some embodiments, the first transaction monitoring file and the second transaction monitoring file include transaction data 512. Second pattern detector 722 has several sub-modules (shown in FIG. 8), similar to first pattern detector 720, for detecting patterns. Using these sub-modules, second pattern detector 722 produces a second pattern data file based on the second plurality of payment card transactions. In the example embodiment, the second transaction monitoring file includes real time payment card transactions. Each payment card transaction in the second plurality of payment card transactions includes a cardholder account, a merchant identifier, a transaction amount, a date and time of the transaction, and at least two locations from a merchant location, a transaction location, an issuer location, a cardholder address, and a location associated with a travel itinerary associated with the cardholder.

A transaction analysis engine 740 is communicatively coupled to rules creation engine 730 and second pattern detector 722. Transaction analysis engine 740 compares the compromise detection rules to the characteristics of the data in the second pattern file. Transaction analysis engine 740 then determines whether the merchant 124 and the cardholder account 132 has been fraudulently compromised (e.g., through a testing event, a network security breach, or any other strong indication of fraud) based on that comparison.

A risk coordination engine 750 is communicatively coupled to transaction analysis engine 740. Risk coordination engine 750 may send an electronic alert to at least one of a compromised merchant 654, a payment card issuer 656, and a cardholder 658 with a compromised account regarding fraudulent compromises that transaction analysis engine 740 has determined to have occurred. Risk coordination engine 750 also reads from database 701 (connection not shown) a fraud risk rules file including a set of fraud risk rules. Risk coordination engine 750 then uses the set of fraud risk rules to calculate, for each merchant and cardholder account determined to have been fraudulently compromised, a likelihood of the merchant or cardholder account being used for future fraudulent transactions. For each such merchant or cardholder account, if the calculated likelihood is above a fraud risk threshold, then risk coordination engine 750 classifies the merchant or cardholder account as "high-risk."

The fraud risk threshold could be defined in the fraud risk rules, by a user, or by another value stored in database 701.

A fraud identification engine 760 is communicatively coupled to risk coordination engine 750. Fraud identification engine 760 combines the calculated likelihoods for the merchants and cardholder accounts classified as high-risk with a fraud risk transaction model used to create a combined model for identifying fraudulent transactions in real time. This combination increases the accuracy rate at identifying whether a given real-time transaction is fraudulent. In one embodiment, fraud identification engine 760 identifies fraudulent transactions in real time using the combined model and directs a payment card network to reject the fraudulent transactions (e.g., by not authenticating or authorizing the transactions). In another embodiment, fraud identification engine 760 may, additionally or alternatively, identify fraudulent transactions using external data 598 (shown in FIG. 5).

Risk coordination engine 750 continually or periodically tracks the merchants classified as high-risk, the cardholder accounts classified as high-risk, and the fraudulent transactions identified by fraud identification engine 760. The tracking done by risk coordination engine 750 is done to facilitate machine learning for the improvement of the set of fraud risk rules. In one embodiment, risk coordination engine 750 measures the accuracy of the set of fraud risk rules based on several checks. Risk coordination engine 750 checks whether the tracked cardholder accounts ended up seeing fraudulent transactions in a pattern that corresponds with a high-risk of fraud. Risk coordination engine 750 also checks whether the tracked merchants ended up seeing fraudulent transactions in a pattern that corresponds with a high-risk of fraud. Risk coordination engine 750 further checks whether the tracked identified fraudulent transactions occurred on accounts classified as high-risk or on accounts not classified as high-risk.

These checks assist the risk coordination engine 750 to measure the accuracy of the existing set of fraud risk rules and to measure the accuracy of potential adjustments to the set of fraud risk rules. If a potential adjustment to the set of fraud risk rules would result in an increased accuracy rate for predicting fraudulent transactions, then risk coordination engine 750 will adjust the set of fraud risk rules accordingly. Risk coordination engine 750 will also save the adjusted set of fraud risk rules to the fraud risk rules file for future use. In alternative embodiments, risk coordination engine 750 may save the adjusted set of fraud risk rules to a separate fraud risk rules file or to another location.

FIG. 8 shows an example configuration 800 of a pattern detector 810, in accordance with one embodiment of the present disclosure. In this embodiment, pattern detector 810 includes several modules. These modules are each configured to analyze a plurality of payment card transactions for patterns and write a file containing the resulting pattern data regarding the plurality of payment card transactions. The modules may also correlate the plurality of payment card transactions with information from external data 512 (shown in FIG. 5) to assist in the analysis.

A transaction amount monitoring module 820 recognizes transaction amounts within a defined range. Transaction amount monitoring module 820 then writes a transaction amount monitoring file based on these recognized transaction amounts.

A point-of-purchase monitoring module 830 recognizes payment card transactions associated with cardholder accounts 132 that previously made payment card transactions at merchant 124 that is associated with at least one of a security breach, a testing transaction event, and a compromise of payment card information. Point-of-purchase monitoring module 830 then writes a point-of-purchase monitoring file based on these recognized transactions.

A transaction locations monitoring module 840 compares, for each payment card transaction in the plurality of payment card transactions, at least two locations from a merchant location, a transaction location, an issuer location, a cardholder address, and a location associated with a travel itinerary associated with cardholder 122. Transaction locations monitoring module 840 then writes a transaction locations monitoring file based on these location comparisons.

A compromised account monitoring module 850 recognizes payment card transactions associated with cardholder accounts 132 that have been associated with at least one of a security breach, a testing transaction event, and a compromise of payment card information. Compromised account monitoring module 850 then writes a compromised account monitoring file based on these recognized transactions.

A declines monitoring module 860 recognizes payment card transactions associated with cardholder accounts 132 that have a historical pattern of payment card transactions being declined by issuer 130 of a payment card associated with the cardholder account 132. Declines monitoring module 860 then writes a declines monitoring file based on these recognized transactions.

Pattern detector 810 uses the patterns analyzed by these modules to produce a pattern data file. For example, in one embodiment, pattern detector 810 produces the pattern data file based on the plurality of payment card transactions, the transaction amount monitoring file, the point-of-purchase monitoring file, the transaction locations monitoring file, the compromised account monitoring file, and the declines monitoring file.

FIG. 9 is a flowchart illustrating an example process 900 for identifying fraudulently compromised merchant 124 and cardholder accounts 132, which may be implemented utilizing the detection system shown in FIG. 2. Process 900 may be implemented by a computing device, for example, server system 210, in cooperation with fraud detection device 250 (shown in FIG. 2). In an example embodiment, process 900 begins at step 902, where a fraud detection system (e.g., fraud detection device 250) is configured to retrieve a first transaction monitoring file, including a first plurality of transactions, from database 701 database 601 (shown in FIG. 6). In step 904, fraud detection device 250 produces a first pattern data file based on patterns detected in the first plurality of transactions from step 902. In step 906, fraud detection device 250 generates a set of compromise detection rules based on the first pattern data file from step 904. In step 908, fraud detection device 250 retrieves a second transaction monitoring file, including a second plurality of transactions, from database 701 database 601. In step 910, fraud detection device 250 produces a second pattern data file based on patterns detected in the second plurality of transactions from step 908. In step 912, fraud detection device 250 compares the set of compromise detection rules with characteristics of data in the second pattern data file from step 910. In step 914, fraud detection device 250 determines, based on the comparison in step 912, whether at least one of merchant 124 and cardholder account 132 has been fraudulently compromised.

FIG. 10 is a flowchart illustrating an exemplary process 1000 for handling compromises detected by fraud detection device 250, which may be implemented using the fraud detection system shown in FIG. 2. Process 1000 may also be utilized together with process 900, described above with respect to FIG. 9. In the example embodiment, process 1000 begins at step 1002, where a computing device of a server system (e.g., server system 210, FIG. 2) is configured to send an electronic alert to at least one of merchant 124, issuer 130, and cardholder 122. In one embodiment, server system 210 and fraud detection device 250 are part of the same computing device. In the example embodiment, fraud detection device 250 sends an electronic alert containing information regarding fraudulent compromises of at least one of merchant 124 and cardholder account 132. The electronic alert may be an email, an automated phone call, a text message, an application notification, a web-based notification sent to a cardholder 122's online profile, or any other electronic communication sent over a network (e.g. the Internet, mobile communication networks, and so forth). In step 1004, fraud detection device 250 reads a set of fraud risk rules from a fraud risk rules file. In step 1006, fraud detection device 250 uses the set of fraud risk rules from step 1004 to calculate a likelihood of future fraudulent transactions for at least one of merchant 124 and cardholder account 132. In step 91008, fraud detection device 250 checks whether the calculated likelihood from step 1006 is above a fraud risk threshold. If the calculated likelihood is above the fraud risk threshold, fraud detection device 250 classifies the at least one of merchant 124 and cardholder account 132 as "high-risk."

Figure 11:
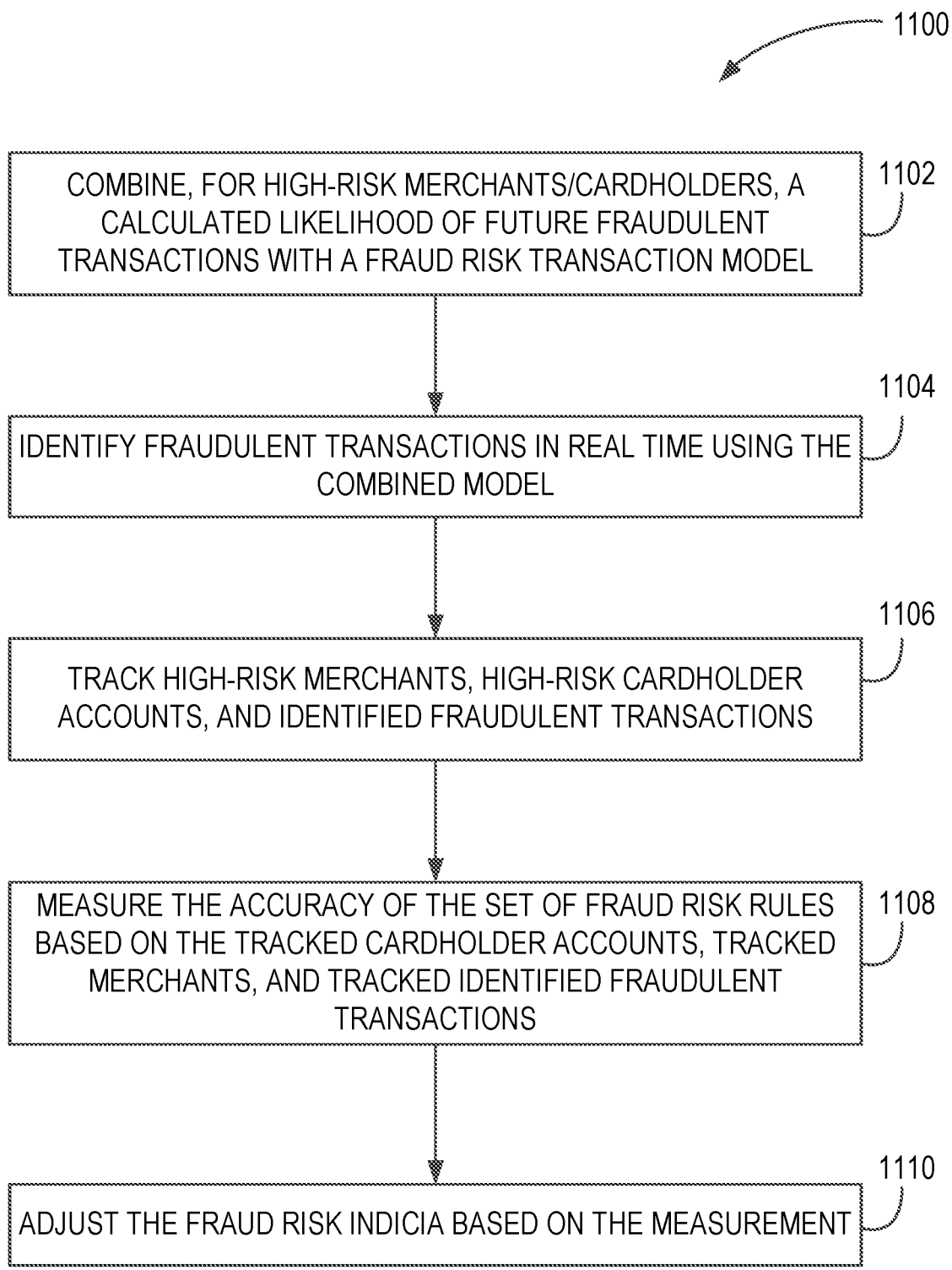

FIG. 11 is a flowchart illustrating an example process 1100 for using machine learning to incrementally adjust the set of fraud risk rules used in steps 1004 and 1006 of FIG. 10. Process 1100 may be utilized together with process 900, described above with respect to FIG. 9, and process 1000, described above with respect to FIG. 10. Process 1100 may be implemented by a computing device, for example, server system 210, in cooperation with fraud detection device 250 (shown in FIG. 2). In one embodiment, server system 210 and fraud detection device 250 are part of the same computing device.

In an example embodiment process 1100 begins at step 1102, where a detection system (e.g., fraud detection device 250) is configured to combine, for at least one of merchant 124 and cardholder account 132 classified as high-risk, a calculated likelihood of future fraudulent transactions with a fraud risk transaction model, which results in a combined model. In step 1104, fraud detection device 250 identifies fraudulent transactions in real time. Fraud detection device 250 may accomplish this identification using the combined model from step 1102. Fraud detection device 250 may, additionally or alternatively, use external data 512 to identify fraudulent transactions. Fraud detection device 250 may also direct a payment card network to reject the identified fraudulent transactions (e.g., by not authenticating or authorizing the transactions) at this stage. In step 1106, fraud detection device 250 tracks the at least one of merchant 124 and cardholder account 132 classified as high-risk, and tracks the fraudulent transactions identified in step 1004. Fraud detection device 250 may perform this tracking continually or periodically.

In step 1108, fraud detection device 250 measures the accuracy of the set of fraud risk rules based on the tracked cardholder accounts 132, tracked merchants, and tracked identified fraudulent transactions. For this step, fraud detection device 250 checks whether the tracked cardholder accounts 132 ended up seeing fraudulent transactions in a pattern that corresponds with a high-risk of fraud. Fraud detection device 250 also checks whether the tracked merchants ended up seeing fraudulent transactions in a pattern that corresponds with a high-risk of fraud. Fraud detection device 250 further checks whether the tracked identified fraudulent transactions occurred on accounts classified as high-risk or on accounts not classified as high-risk. These checks assist the fraud detection device 250 to measure the accuracy of the existing set of fraud risk rules and to measure the accuracy of potential adjustments to the set of fraud risk rules. In step 1110, if a potential adjustment to the set of fraud risk rules would result in an increased accuracy rate for predicting fraudulent transactions, then fraud detection device 250 will adjust the set of fraud risk rules accordingly to achieve this increase in accuracy. Fraud detection device 250 will also save the adjusted fraud risk rules to a fraud risk rules file for future use.

Figure 12:
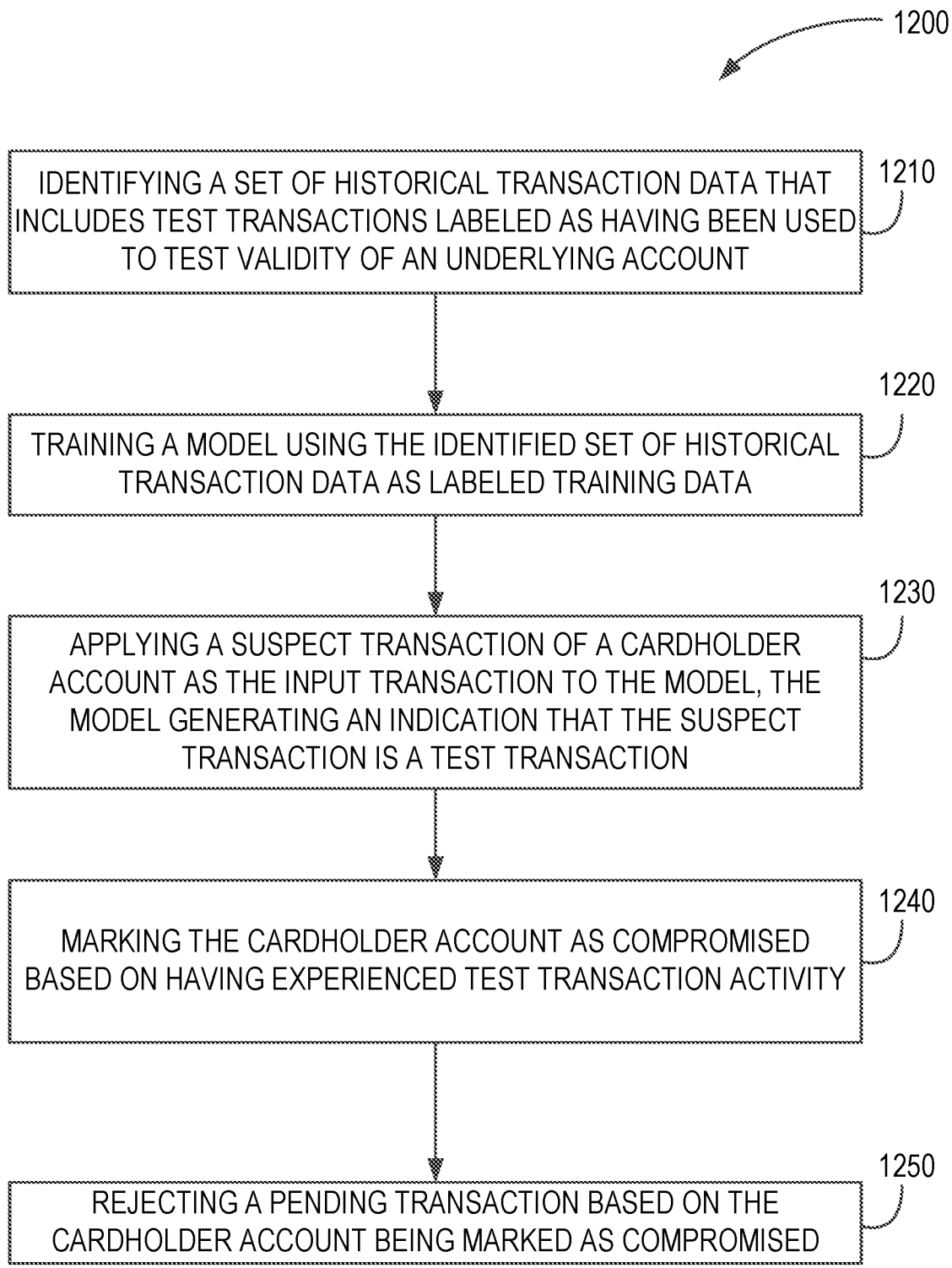

FIG. 12 is a flowchart illustrating an example method 1200 for detecting fraud within a payment card network. Method 1200 may be utilized together with processes 900, 1000, and 1100 described above with respect to FIGS. 9, 10, and 11, respectively. Method 1200 may be implemented by a computing device, for example, server system 210, in cooperation with fraud detection device 250 (shown in FIG. 2). In one embodiment, server system 210 and fraud detection device 250 are part of the same computing device.

In an example embodiment, method 1200 begins at step 1210, where a detection system (e.g., fraud detection device 250) is configured to identify a set of historical transaction data, the set of historical transaction data includes one or more test transactions labeled as having been used to test validity of an underlying account. At step 1220, the fraud detection device 250 trains a model using the identified set of historical transaction data as labeled training data, the model is configured to accept transaction data associated with an input transaction as input, the model is also configured to classify the input transaction as one of a test transaction and not a test transaction. In some embodiments, at least some of the one or more test transactions of the set of historical transaction data are labeled as common point-of-purchase (CPP) type test transactions, wherein CPP test transactions involve a common point of purchase (CPP) with other test transactions. In some embodiments, at least some of the one or more test transactions of the set of historical transaction data are labeled as small-ticket type test transactions, wherein small-ticket type test transactions involve a transaction amount that falls below a predetermined threshold. In some embodiments, at least some of the one or more test transactions of the set of historical transaction data are labeled as cross-border type test transactions, wherein cross-border type test transactions involve a transaction having a purchasing entity in one country and a selling entity in a different country.

At step 1230, in the example embodiment, the fraud detection device 250 applies a suspect transaction of a cardholder account as the input transaction to the model, the model generates an indication that the suspect transaction is a test transaction. In some embodiments, applying a suspect transaction further includes applying a plurality of suspect transactions of the cardholder as input transactions to the model, the plurality of suspect transactions being historical transactions of the cardholder previously authorized by the payment card network. At step 1240, the fraud detection device 250 marks the cardholder account as compromised based on having experienced test transaction activity. At step 1250, the fraud detection device 250 rejects a pending transaction based on the cardholder account being marked as compromised.

In some embodiments, the fraud detection device 250 also determines a risk score based on one or more indicia indicating a likelihood of the cardholder account to experience future fraud, and rejecting the pending transaction is further based on the value of the risk score. In some embodiments, the one or more indicia indicating a likelihood of the cardholder account to experience future fraud is a transaction date of the test transaction, wherein a more recent transaction date indicates a higher likelihood of future fraud. In some embodiments, the fraud detection device 250 automatically provisions additional computing resources to the system based on detecting a plurality of test transactions using the model on pending transactions over a predetermined period of time.

Figure 13:
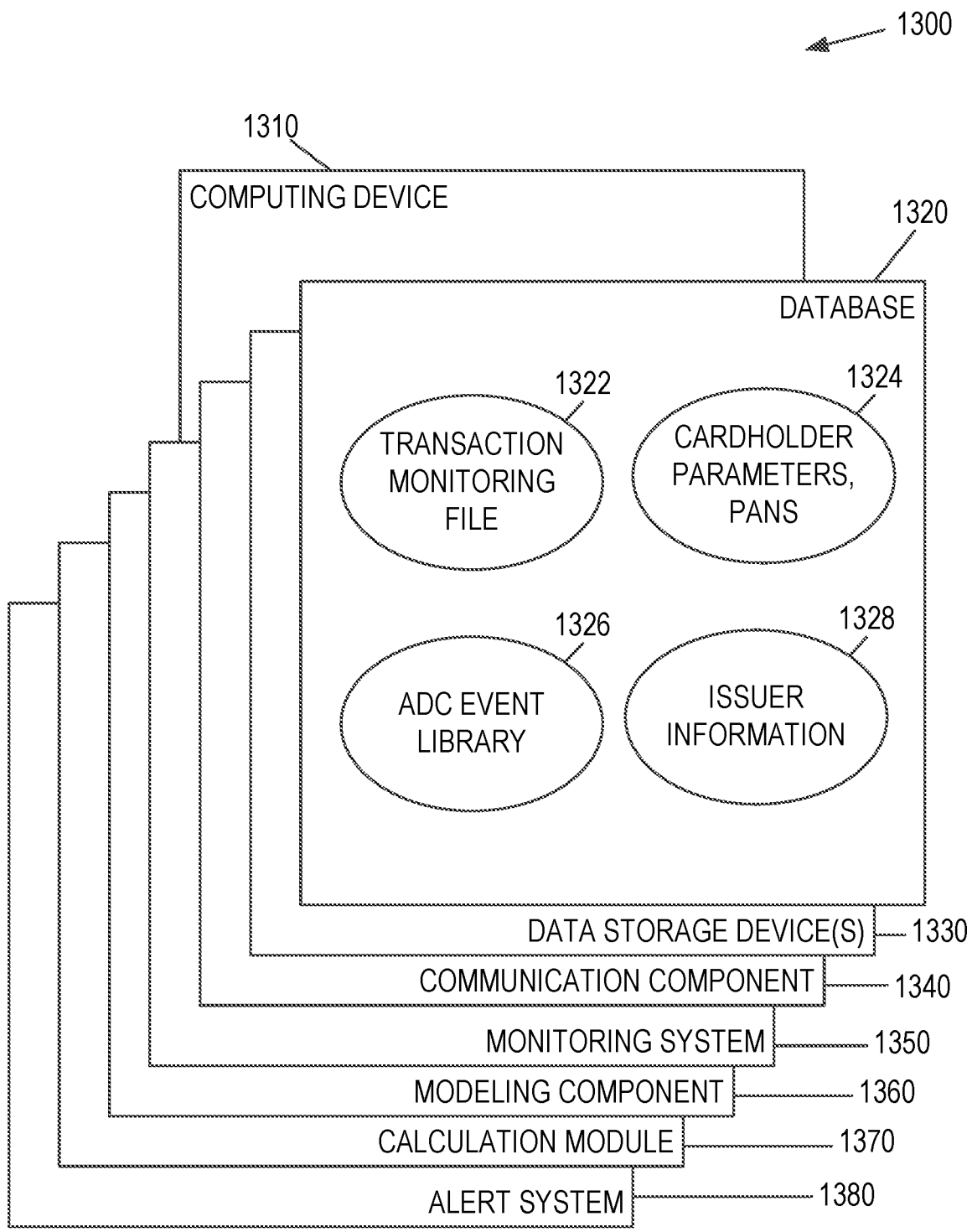

FIG. 13 is a component diagram of an example computing system 1300 including multiple components for performing the processes described herein. In an example embodiment, system 1300 includes a computing device 1310, which includes a database 1320 and one or more data storage devices 1330. In some embodiments, computing device 1310 is similar to server system 210 or fraud detection device 250 (both shown in FIG. 2). Database 1320 may be coupled with several separate components that perform specific tasks within computing device 1310. In the exemplary embodiment, database 1320 includes at least one transaction monitoring file 1322, cardholder parameters, characteristics, and PANs 1324, an ADC event library 1326, and issuer information 1328. In some embodiments, database 1320 is similar to database 216 (shown in FIG. 2).

In the example embodiment, transaction monitoring file 1322 contains common pattern data including, without limitation, a plurality of payment card transactions, information regarding activity of one or more merchants 124 or accounts 132, usage of the one or more accounts 132 over time, associations of the one or more merchants or accounts 132, clustering of events for the one or more merchants 124 or accounts 132, as well as any changes to any one or more of these parameters/characteristics within a predetermined time frame. The predetermined timeframe may, for example, be dynamically adjusted according to information continually updated within transaction monitoring file 1322. In some embodiments, transaction monitoring file 1322 may be the same or substantially similar to the first transaction monitoring file retrieved in step 902 shown in FIG. 8 or the second transaction monitoring file retrieved in step 908 shown in FIG. 8. In other embodiments, transaction monitoring file 1322 may contain transaction data 510 shown in FIG. 5 or substantially similar data.

In the example embodiment, computing device 1310 further includes a communication component 1340, a monitoring system 1350, a modeling component 1360, a calculation module 1370, and an alert system 1380. Monitoring system 1350 may, for example, be comparable to fraud detection device 250, FIG. 2. In an exemplary embodiment, communication component 1340 is configured to electronically receive and transmit data between several components of system 1300, as described above. In the exemplary embodiment, modeling component 1360 is configured to generate a comparison model or set of rules based on information (e.g., 1322, 1324, 1326, 1328) contained within database 1320. Modeling component 1360 may then continually update the generated model/rules in a dynamic manner as more data is gathered by monitoring system 1350 and received from communication component 1340.

Calculation module 1370 is configured to compare the model/rules generated by modeling component 1360 with a plurality of transactions stored in transaction monitoring file 1322, and to calculate likelihoods based on the comparison for one or more individual PANs of those PANs being used for future fraudulent transactions. In an exemplary embodiment, alert system 1380 is configured to notify (e.g., through communication component 1340) payment card issuers 130 or individual cardholders 122 of calculated likelihoods, compromised PANs, or pertinent ADC events.

According to the advantageous systems and methods described herein, a payment card network may advantageously develop and customize transaction criteria to identify compromised merchants 124 and cardholder accounts 132, to identify merchants 124 and cardholder accounts 132 that have a high risk for fraud before significant fraud occurs, and to identify fraudulent transactions in real time. Additionally, by generating and using a set of compromise detection rules, the systems and methods described herein may identify compromised merchants 124 and cardholder accounts 132 that are not otherwise known to be compromised, or associated with a known ADC event. By generating and using a set of fraud risk rules, the systems and methods described herein may further categorize the compromised merchants 124 and cardholder accounts 132 according to a calculated probability/confidence score indicating the level of risk to which the merchants 124 and cardholder accounts 132 may be exposed (e.g., "low," "medium," "high," "very high," etc.). Using these confidence scores, the payment card issuer bank 130 may advantageously prioritize the order in which compromised PANs are replaced or investigated. Investigations into individual fraud events can be very time-consuming and costly, and the present systems and methods allow a payment card issuer 130 to proactively identify and score compromises to their cardholder accounts 132 and replace the associated PANs before significant fraud occurs.

Through the advantageous embodiments described herein, the payment card issuer 130 may conduct its own cost-benefit analysis and determine a level of acceptable risk before an individual PAN should be replaced. The payment card issuer 130 has, for example, the options to replace the PAN and associated payment card, to place the PAN in a special queue for further monitoring, develop special rules for a particular ADC event that would affect the calculated likelihood, etc. In many instances, a payment card network realizes additional advantages over individual payment card issuers 130 implementing the present systems and methods. Payment card issuer 130, for example, will typically only have access to transaction information of its own individual cardholder accounts 132, whereas a payment card network is able to monitor PAN information from multiple payment card issuers 130, merchants 124, and transactions simultaneously. The payment card network will therefore have significantly more data available to it, and therefore greater capability to build more accurate models/rules against which all payment card issuers 130 within the payment card network may compare individual cardholder accounts 132.

Example embodiments of systems and methods for detecting fraud are described above in detail. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

For example, the methods may also be used in combination with other account systems and methods, and are not limited to practice with only the transaction card account systems and methods as described herein. Rather, the example embodiment can be implemented and utilized in connection with many other data storage and analysis applications. While the disclosure has been described in terms of various specific embodiments, those skilled in the art will recognize that particular elements of one drawing in the disclosure can be practiced with elements of other drawings herein, or with modification thereto, and without departing from the spirit or scope of the claims.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of fraud analysis of payment card transactions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), or any transmitting/receiving medium such as the Internet or other communication network or link. The article of manufacture containing the computer code may be made or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural or object-oriented programming language, or in assembly/machine language. As used herein, the terms "machine-readable medium" and "computer-readable medium" refer to any computer program product, apparatus or device (e.g., magnetic discs, optical disks, memory, Programmable Logic Devices (PLDs)) used to provide machine instructions or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions or data to a programmable processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for detecting fraud within a payment card network, the system comprising:
   a memory storing historical transaction data; and
   at least one processor configured to execute instructions that cause the at least one processor to:
      prepare a set of historical transaction data for machine learning model training by:
         labeling a first subset of historical transactions of the set of historical transaction data as test transactions, representing transactions having been fraudulently initiated by a fraudster to test validity of an underlying account, wherein the first subset of historical transactions have a transaction amount that falls below a predetermined threshold such that the transaction amount is configured to avoid notice of a legitimate holder of the underlying account; and
         labeling a second subset of historical transactions of the set of historical transaction data as not test transactions, representing transactions that are not fraudulent test transactions,
      train a machine learning model using the identified set of historical transaction data as labeled training data, the machine learning model is constructed as a classifier type model that accepts transaction data associated with an input transaction as input and classifies the input transaction as one of (A) a test transaction and (B) not a test transaction;
      detect at least one suspect transaction of a cardholder account;
      retrieve external data for the cardholder account from one or more external data sources;
      apply transaction data of the at least one suspect transaction of the cardholder account as input with the external data to the trained machine learning model, wherein the trained machine learning model generates an output that classifies the at least one suspect transaction as a test transaction;
      mark the cardholder account as compromised based on classification of the at least one suspect transaction as a test transaction; and
      reject a pending transaction based on the cardholder account being marked as compromised.

2. The system of claim 1, wherein the instructions further cause the at least one processor to automatically provision additional computing resources to the system based on detecting a plurality of test transactions using the trained machine learning model on pending transactions over a predetermined period of time.

3. The system of claim 1, wherein the instructions further cause the at least one processor to:
   label as test transactions a third subset of historical transactions of the set of historical transaction data, wherein the third subset of historical transactions are identified as common point-of-purchase (CPP) type test transactions, wherein CPP test transactions involve a common point of purchase (CPP) with other test transactions; and
   retrain the machine learning model with the third subset of historical transactions.

4. The system of claim 1, wherein the first subset of historical transactions are labeled as small-ticket type test transactions, wherein the predetermined threshold does not exceed one dollar.

5. The system of claim 1, wherein the instructions further cause the at least one processor to:
   receive, in real-time, a pending transaction associated with the cardholder account;
   determine a time difference between the pending transaction and the test transaction; and reject a pending transaction based on the cardholder account being marked as compromised and the time difference between the pending transaction and the test transaction.

6. The system of claim 1, wherein the external data includes information regarding potential fraud.

7. The system of claim 6, wherein the external data includes at least one of a list of merchants where a breach is known or suspected, a list of merchants known or suspected to be a test merchant or a testing site, a list of payment card information known or suspected to be compromised, financial reporting data for one or more merchants, a list of network traffic volume for a particular network or region of a network, and a list of anomalies in such network traffic volume.

8. The system of claim 6, wherein the external data includes information regarding known or suspected compromises of payment card information including at least one of a level of certainty that the payment card information was compromised, timing of discovery of the compromise, number of payment cards associated with the compromise, timing of the last detected fraudulent transaction by a payment card associated with the compromise, and number of detected fraudulent transactions by payment cards associated with the compromise within a defined time frame.

9. The system of claim 6, wherein the external data includes information regarding a known or suspected breach include at least one of a level of certainty that the breach occurred, timing of the breach, timing of discovery of the breach, source of the breach, and method of the breach.

10. The system of claim 6, wherein the external data includes information regarding known or suspected testing activity including at least one of a level of certainty that the testing activity occurred, timing of the testing activity, timing of discovery of the testing activity, source of the testing activity, and method of the testing activity.

11. The system of claim 1, wherein the machine learning model is also trained with external data from the one or more external data sources.

12. The system of claim 1, further comprising labeling as test transactions a fourth subset of historical transactions of the set of historical transaction data, wherein the fourth subset of historical transactions are identified as cross-border type test transactions, wherein cross-border type test transactions involve a transaction having a purchasing entity in one country and a selling entity in a different country; and wherein the instructions further cause the at least one processor to retrain the machine learning model with the fourth subset of historical transactions.

13. The system of claim 1, wherein applying the at least one suspect transaction further includes applying a plurality of suspect transactions of a cardholder of the cardholder account as input transactions to the trained machine learning model, the plurality of suspect transactions being historical transactions of the cardholder previously authorized by the payment card network.

14. The system of claim 1, wherein the instructions further cause the at least one processor to:
determine a risk score based on one or more indicia indicating a likelihood of the cardholder account to experience future fraud,
wherein rejecting the pending transaction is further based on the value of the risk score.

15. A computer-implemented method for detecting fraud within a payment card network, the method implemented using a processor in communication with a memory, the method comprising:

preparing a set of historical transaction data for machine learning model training, by:
labeling a first subset of historical transactions of the set of historical transaction data as test transactions, representing transactions having been fraudulently initiated by a fraudster to test validity of an underlying account, wherein the first subset of historical transactions have a transaction amount that falls below a predetermined threshold such that the transaction amount is configured to avoid notice of a legitimate holder of the underlying account; and
labeling a second subset of historical transactions of the set of historical transaction data as not test transactions, representing transactions that are not fraudulent test transactions;
training a machine learning model using the identified set of historical transaction data as labeled training data, the machine learning model being constructed as a classifier type model that accepts transaction data associated with an input transaction as input and classifies the input transaction as one of (A) a test transaction and (B) not a test transaction;
detecting at least one suspect transaction of a cardholder account;
retrieving external data for the cardholder account;
applying transaction data of the at least one suspect transaction of the cardholder account as input with the external data to the trained machine learning model, wherein the trained machine learning model generates an output that classifies the at least one suspect transaction as a test transaction;
marking the cardholder account as compromised based on classification of the at least one suspect transaction as a test transaction; and
rejecting a pending transaction based on the cardholder account being marked as compromised.

16. The computer-implemented method of claim 15, further comprising automatically provisioning additional computing resources based on detecting a plurality of test transactions using the trained machine learning model on pending transactions over a predetermined period of time.

17. The computer-implemented method of claim 15, wherein the first subset of historical transactions are labeled as small-ticket type test transactions, wherein the predetermined threshold does not exceed one dollar.

18. The computer-implemented method of claim 15, wherein the external data includes information regarding potential fraud including at least one of a list of merchants where a breach is known or suspected, a list of merchants known or suspected to be a test merchant or a testing site, a list of payment card information known or suspected to be compromised, financial reporting data for one or more merchants, a list of network traffic volume for a particular network or region of a network, a list of anomalies in such network traffic volume, information regarding known or suspected compromises of payment card information, information regarding a known or suspected breach, and information regarding known or suspected testing activity.

19. The computer-implemented method of claim 15, wherein the machine learning model is also trained with external data from one or more external data sources.

20. A non-transitory computer readable medium that includes computer executable instructions wherein, when executed by a computing device comprising at least one processor in communication with at least one memory device, the computer executable instructions cause the computing device to:

prepare a set of historical transaction data for machine learning model training by:
   labeling a first subset of historical transactions of the set of historical transaction data as test transactions, representing transactions having been fraudulently initiated by a fraudster to test validity of an underlying account, wherein the first subset of historical transactions have a transaction amount that falls below a predetermined threshold such that the transaction amount is configured to avoid notice of a legitimate holder of the underlying account; and
   labeling a second subset of historical transactions of the set of historical transaction data as not a test transaction, representing transactions that are not fraudulent test transactions;
train a machine learning model using the identified set of historical transaction data as labeled training data, the machine learning model is constructed as a classifier type model that is configured to accept transaction data associated with an input transaction as input and classifies the input transaction as one of (A) a test transaction and (B) not a test transaction;
detect at least one suspect transaction of a cardholder account;
retrieve external data for the cardholder account;
apply transaction data of the at least one suspect transaction of the cardholder account as input with the external data to the trained machine learning model, wherein the trained machine learning model generates an output that classifies the at least one suspect transaction as a test transaction;
mark the cardholder account as compromised based on classification of the at least one suspect transaction as a test transaction; and
reject a pending transaction based on the cardholder account being marked as compromised.

* * * * *